(12) United States Patent
Iwashita

(10) Patent No.: US 8,892,937 B2
(45) Date of Patent: Nov. 18, 2014

(54) PARALLEL COMPUTER SYSTEM, CONTROL DEVICE, AND CONTROLLING METHOD

(75) Inventor: Hidetoshi Iwashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 313 days.

(21) Appl. No.: 13/352,462

(22) Filed: Jan. 18, 2012

(65) Prior Publication Data

US 2012/0246512 A1  Sep. 27, 2012

(30) Foreign Application Priority Data

Mar. 22, 2011  (JP) .................................. 2011-063401

(51) Int. Cl.
*G06F 11/00*  (2006.01)
*G06F 9/50*  (2006.01)
*G06F 11/14*  (2006.01)
*G06F 11/20*  (2006.01)

(52) U.S. Cl.
CPC .......... *G06F 9/5066* (2013.01); *G06F 11/1423* (2013.01); *G06F 11/2007* (2013.01)
USPC ................................. 714/4.2; 714/25; 714/48

(58) Field of Classification Search
USPC ..................... 714/4.2, 4.1, 25, 4.11
See application file for complete search history.

(56) References Cited

U.S. PATENT DOCUMENTS

| 8,504,731 B2 | 8/2013 | Ajima et al. | |
| 2008/0263386 A1* | 10/2008 | Darrington et al. | ............... 714/4 |

FOREIGN PATENT DOCUMENTS

| JP | 06-161976 A | 6/1994 |
| WO | 2009/139024 A1 | 11/2009 |

OTHER PUBLICATIONS

Ashir, Y. A. et al., "Embeddings of cycles, meshes and tori in faulty k-ary n-cubes," Proceedings, 1997 International Conference on Parallel and Distributed Systems, IEEE Comput. Soc., pp. 429-435, XP010267067.

Tseng, Y. et al., "Fault-Tolerant Ring Embedding in a Star Graph with Both Link and Node Failures," IEEE Transactions on Parallel and Distributed Systems, vol. 8, No. 12, Dec. 1, 1997, XP000727611, pp. 1185-1195.

(Continued)

*Primary Examiner* — Sarai Butler
(74) *Attorney, Agent, or Firm* — Fujitsu Patent Center

(57) ABSTRACT

The control device detects a failed node in which a failure has occurred from a plurality of computation nodes included in a plurality of computation units included in the parallel computer. The control device chooses execution nodes for executing the program from the computation nodes of the parallel computer except the detected failed nodes based on the number of computation nodes needed to execute the program. The control device selects a paths to connect the computation nodes from a plurality of links each connecting two computation units adjacent to each other through a plurality of paths configured to connect computation nodes included in two computation units adjacent to each other in a one-to-one manner included in the links connecting two computation units adjacent to each other in the plurality of computation units including the choosed execution nodes except the path connected to the detected failed node.

19 Claims, 37 Drawing Sheets

(56) References Cited

OTHER PUBLICATIONS

Wang, A. et al., "Fault-Tolerant Embeddings of Rings, Meshes, and Tori in Hypercubes," Proceedings of the Fourth IEEE Symposium on Parallel and Distributed Processing, pp. 20-29, 1992, XP010031355.
Yang, X. et al., "Embedding meshes/tori in faulty crossed cubes," Information Processing Letters, vol. 110, No. 14-15, Jul. 1, 2012, pp. 559-564, XP027064025.

Extended European Search Report dated Aug. 6, 2012 for corresponding European Application No. 12152771.7.
JPOA—Japanese Office Action mailed Sep. 24, 2013 for Japanese Patent Application No. 2011-063401, with partial English-language translation.
"Fault-Tolerant Ring Embedding . . ." Office Action, filed on Aug. 30, 2012.

* cited by examiner

0

1

2

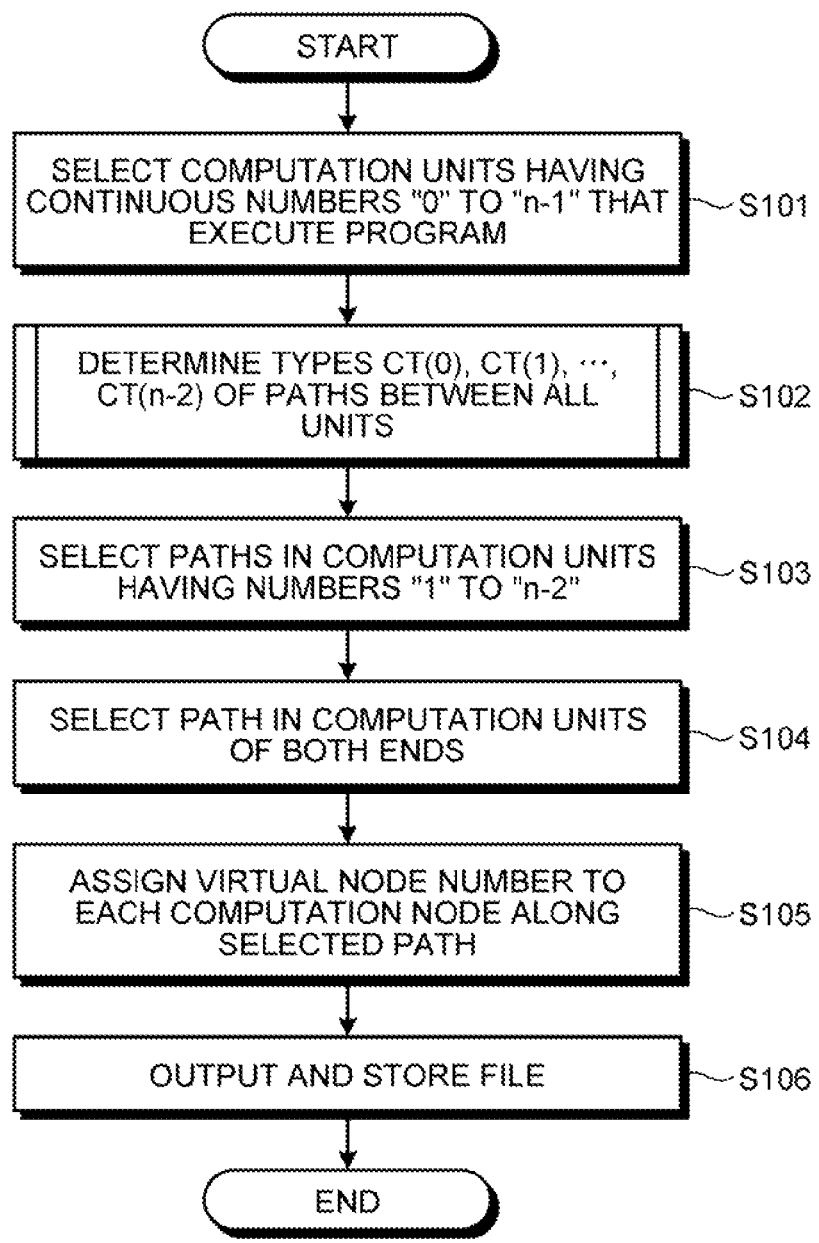

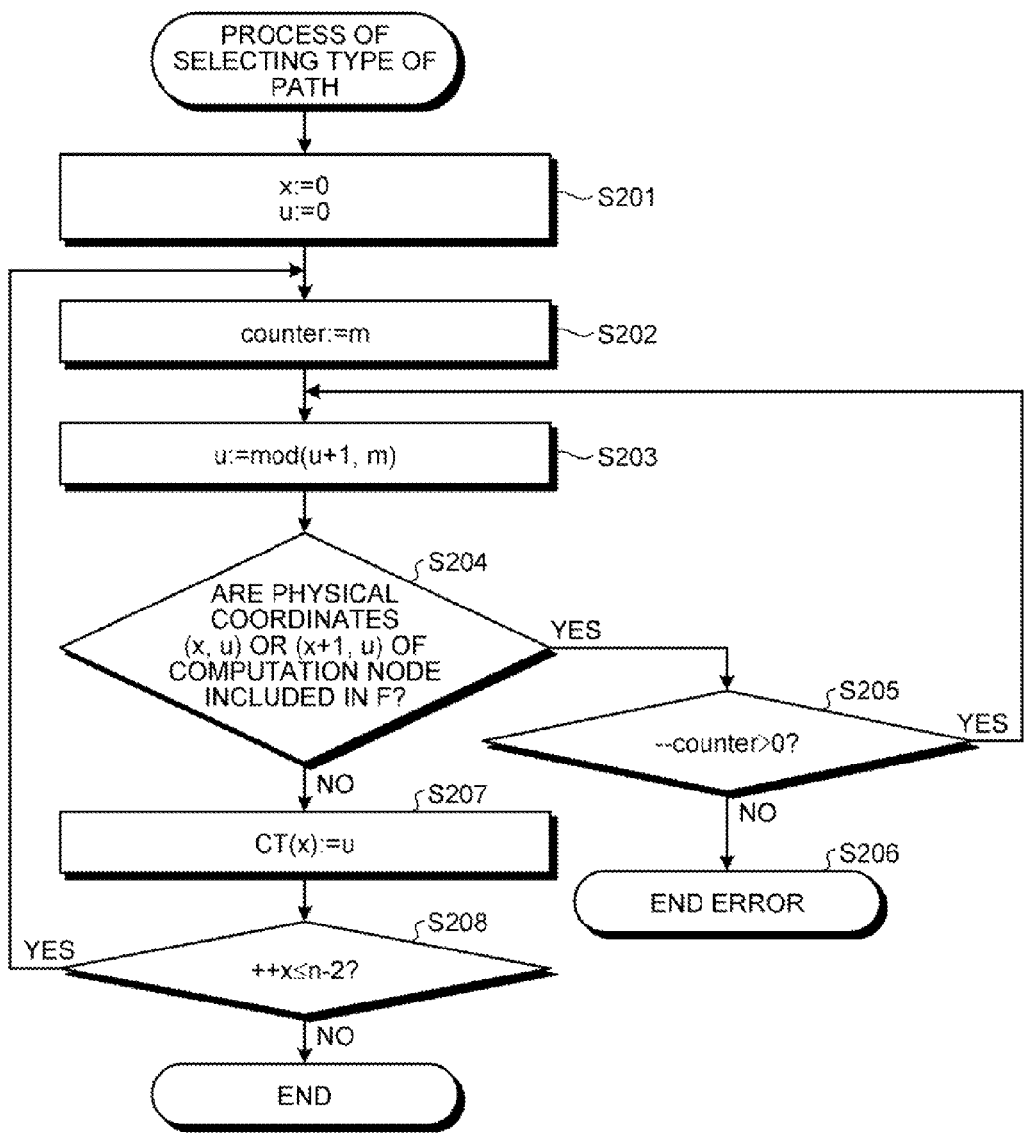

01

12

20

01

12

23

30

02

13

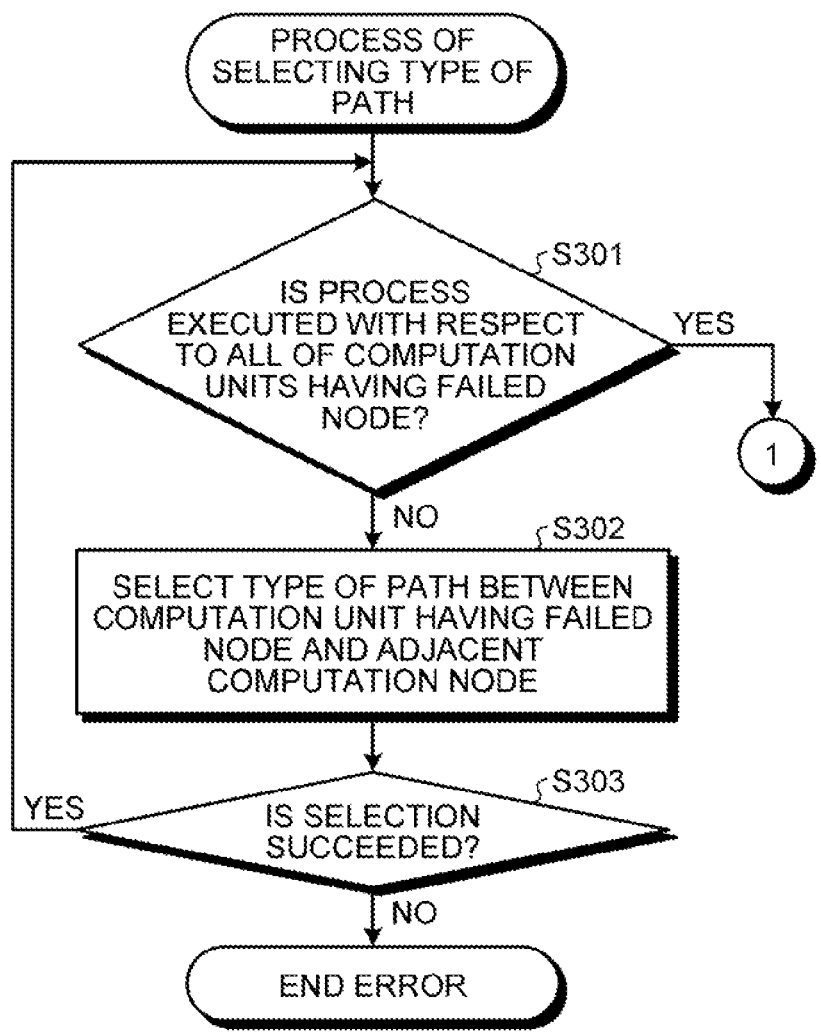

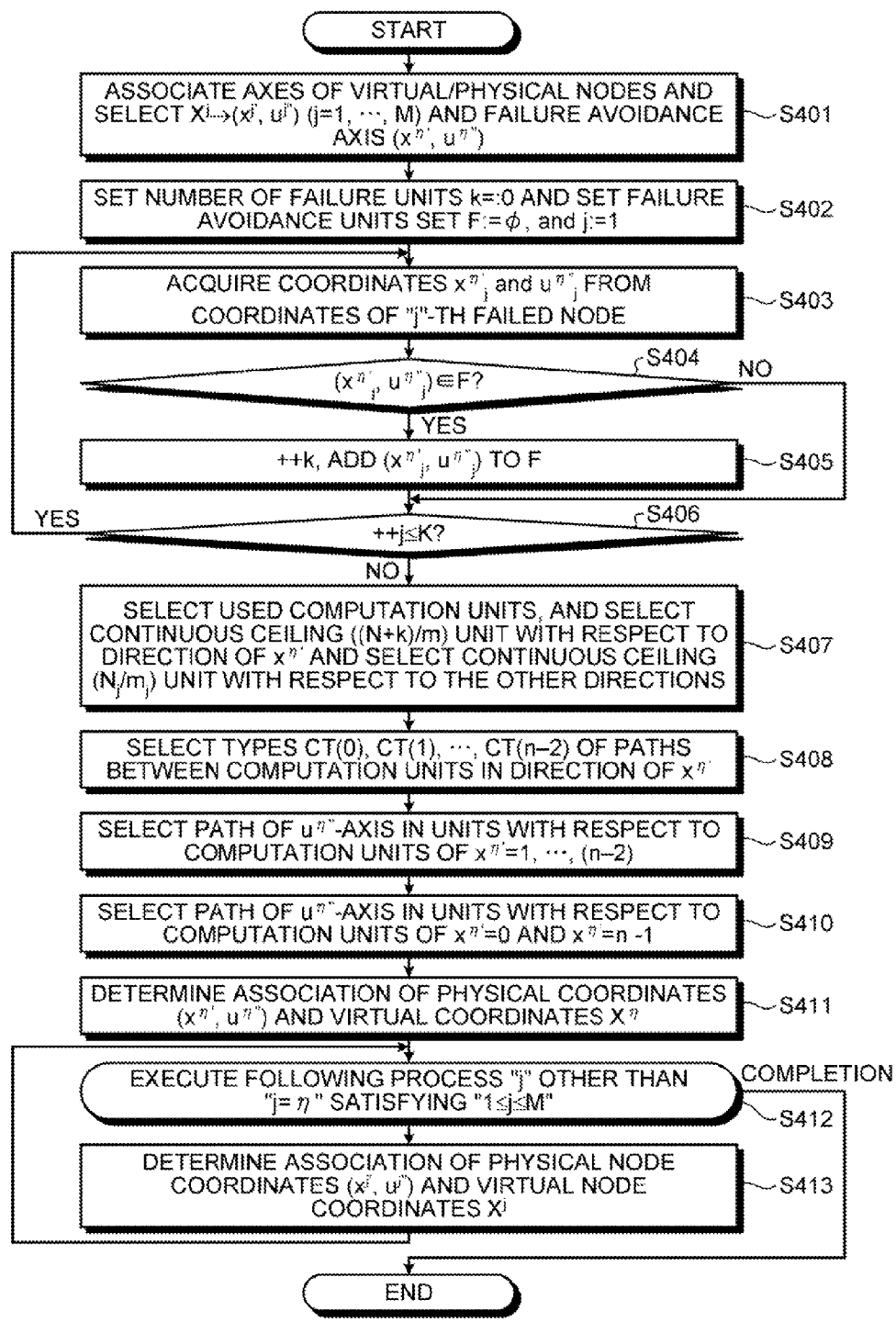

FIG.29

```
#define xy2r(ix,iy) (ix+12*iy)

mpi_send(···, xy2r(ix   ,iy-1), ···);
mpi_send(···, xy2r(ix   ,iy+1), ···);
mpi_send(···, xy2r(ix-1,iy  ), ···);
mpi_send(···, xy2r(ix+1,iy  ), ···);

mpi_recv(···, xy2r(ix   ,iy+1), ···);
mpi_recv(···, xy2r(ix   ,iy-1), ···);
mpi_recv(···, xy2r(ix+1,iy  ), ···);
mpi_recv(···, xy2r(ix-1,iy  ), ···);
```

FIG.30 iy →

|     | 0 | 1 | 2 | 3 | 4 | 5 |
|-----|---|---|---|---|---|---|
| 0   | 0 | 12| 24| 36| 48| 60|
| 1   | 1 |   |   |   |   |   |
| 2   | 2 |   |   |   |   |   |
| .   |   |   |   |   |   |   |
| .   |   |   |   |   |   |   |
| .   |   |   |   |   |   |   |
| .   |   |   |   |   |   |   |
| .   |   |   |   |   |   |   |
| .   |   |   |   |   |   |   |
| .   |   |   |   |   |   |   |
| .   |   |   |   |   |   |   |
| 11  | 11| 23| 35| 47| 59| 71| ix ↓

FIG.31
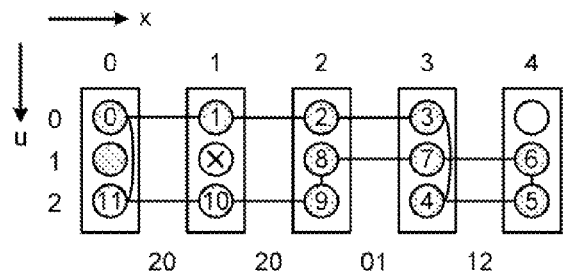
FIG.32
| VIRTUAL COORDINATES ix | 0 | 1 | 2 | 3 | 4 | 5 | 6 | 7 | 8 | 9 | 10 | 11 |
|---|---|---|---|---|---|---|---|---|---|---|---|---|
| PHYSICAL COORDINATES (x, u) | 0, 0 | 1, 0 | 2, 0 | 3, 0 | 3, 2 | 4, 2 | 4, 1 | 3, 1 | 2, 1 | 2, 2 | 1, 2 | 0, 2 |
FIG.33
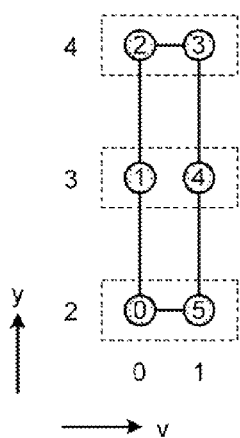

| VIRTUAL COORDINATES iy | 0 | 1 | 2 | 3 | 4 | 5 |
|---|---|---|---|---|---|---|
| PHYSICAL COORDINATES (y, v) | 2, 0 | 3, 0 | 4, 0 | 4, 1 | 3, 1 | 2, 1 |

```
node0200
node1200
node2200
node3200
node3220
node4220
node4210
node3210
node2210
node2220
node1220
node0220
node0300
...
node0320
node0400
..
node0420
node0401
...
node0421
node0301
...
node0321
node0201
...
node0221
```

PARALLEL COMPUTER SYSTEM, CONTROL DEVICE, AND CONTROLLING METHOD

CROSS-REFERENCE TO RELATED APPLICATIONS

This application is based upon and claims the benefit of priority of the prior Japanese Patent Application No. 2011-063401, filed on Mar. 22, 2011, the entire contents of which are incorporated herein by reference.

FIELD

The embodiments discussed herein are directed to a parallel computer system, a control device, a method of controlling a parallel computer system, and a program for controlling a parallel computer system.

BACKGROUND

In the related art, there is a known technology for performing a simulation based on a numerical value computation by a parallel computer which has plural computation nodes. As an example of this technology, a parallel computer system is known which divides a computation space as a simulation object into multiple areas and executes a simulation for each of the divided areas with a different computation node.

The parallel computer system divides the computation space into the plural areas and regularly maps the divided areas to the plural computation nodes, respectively. That is, the parallel computer system maps each of the divided areas to the computation node having the same position relation as the position relation of each area. The parallel computer system causes the respective nodes to execute the simulations for the corresponding areas mapped to the respective nodes, thereby executing the simulation for the entire computation space.

In this case, when each computation node executes the simulation using a difference method, each computation node performs frequent communication with the computation nodes adjacent to itself. When executing a simulation where a correlation between the areas becomes stronger as the distance between the areas decreases, the communication amount increases when the distance between the communicating computation nodes decreases. For this reason, the parallel computer system efficiently executes the simulation using the plural computation nodes connected through a direct interconnection network based on the topology of multi-dimensional orthogonal coordinates.

FIG. 41 is a diagram for describing a network of computation nodes that are connected by a direct interconnection network based on meshed topology. In an example illustrated in FIG. 41, the computation nodes that are adjacent to each other among the plural computation nodes illustrated by circles are connected directly through a link. Since the computation nodes connected in the above-described way can perform communication with the adjacent computation nodes at a high speed, the simulation can be efficiently executed in the case of the execution of the simulation using the difference method or in the case where the areas adjacent to each other are correlated.

FIG. 42 is a diagram illustrating a network of computation nodes that are connected by a direct interconnection network based on torus (annular or toroidal) topology. In an example illustrated in FIG. 42, the computation nodes that are adjacent to each other among the plural computation nodes illustrated by circles are connected directly through a link, and the computation nodes that are positioned at both ends of the network are connected directly by the link. Since the computation nodes connected in the above-described way can perform communication at a higher speed than the computation nodes connected by the direct interconnection network based on the meshed topology even between the computation nodes of both ends, the simulation can be efficiently executed even in the case where a correction exists between both ends of the computation space, like the simulation using periodic boundary conditions. For each computation node, since a communication path between the computation nodes increases, the bisection bandwidth increases. As a result, the traffic between the computation nodes decreases.

However, according to the above technology for connecting the computation nodes by the direct interconnection network based on the topology of the multi-dimensional orthogonal coordinates, when the failed computation nodes are mixed on the network, each area is not mapped to the appropriate computation node.

That is, since the parallel computer system regularly maps each area divided by a program to each computation node, each area is not mapped to the computation node having the same position relation as the position relation of each area when the failed computation nodes are mixed on the network. In this case, each computation node does not efficiently perform communication with the computation nodes to which the areas adjacent to the area mapped to itself are mapped. As a result, since communication efficiency between the computation nodes may be deteriorated, the entire performance of the parallel computer system is deteriorated.

In addition, it is difficult to divide the torus network and to obtain the plural torus networks. For this reason, when the parallel computer system having the torus network executes a multi-job operation, it is difficult to execute each job using the torus network.

A technology that is discussed in the embodiments has been made in view of the above problems and maps each area to the computation node having an appropriate position relation.

SUMMARY

According to an aspect of an embodiment of the invention, a parallel computer system includes a parallel computer that executes a program and a control device that controls the parallel computer. The parallel computer includes a plurality of computation units each having a plurality of computation nodes connected to one another, and a plurality of links each connecting two computation units adjacent to each other through a plurality of paths configured to connect computation nodes included in two computation units adjacent to each other in a one-to-one manner. The control device includes a failed node detecting unit that detects a failed node in which a failure has occurred from the computation nodes. The control device further includes an execution node selecting unit that selects execution nodes for executing the program from the computation nodes of the parallel computer except the detected failed nodes based on the number of computation nodes needed to execute the program. The control device further includes a path selecting unit that selects a path to connect the computation nodes from the paths included in the links which connect two computation units adjacent to each other in the plurality of computation units including the selected execution nodes except the path connected to the detected failed node.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is a flowchart illustrating an example of a flow of a process executed by the control device according to the first embodiment;

FIG. 8 is a flowchart illustrating an example of a process of selecting a type of a path;

FIG. 13 is a flowchart (1) illustrating an example of a process of selecting a type of a path by the control device according to the second embodiment;

FIG. 26 is a flowchart illustrating an example of a flow of a process that is executed by the control device according to the fourth embodiment;

FIG. 29 is a diagram illustrating an example of a program that is executed in the parallel computer by a user;

FIG. 30 is a diagram illustrating plural computation nodes by which the user intends to execute a program;

FIG. 31 is a diagram illustrating an example of a process of selecting a path in an x-axis direction by the control device according to the fifth embodiment;

FIG. 32 is a table illustrating the virtual coordinates in an ix-axis direction assigned to each computation node;

FIG. 33 is a diagram illustrating an example of a process of selecting a path in a y-axis direction by the control device according to the fifth embodiment;

DESCRIPTION OF EMBODIMENTS

Preferred embodiments of the present invention will be explained with reference to accompanying drawings.

[a] First Embodiment

Figure 1:
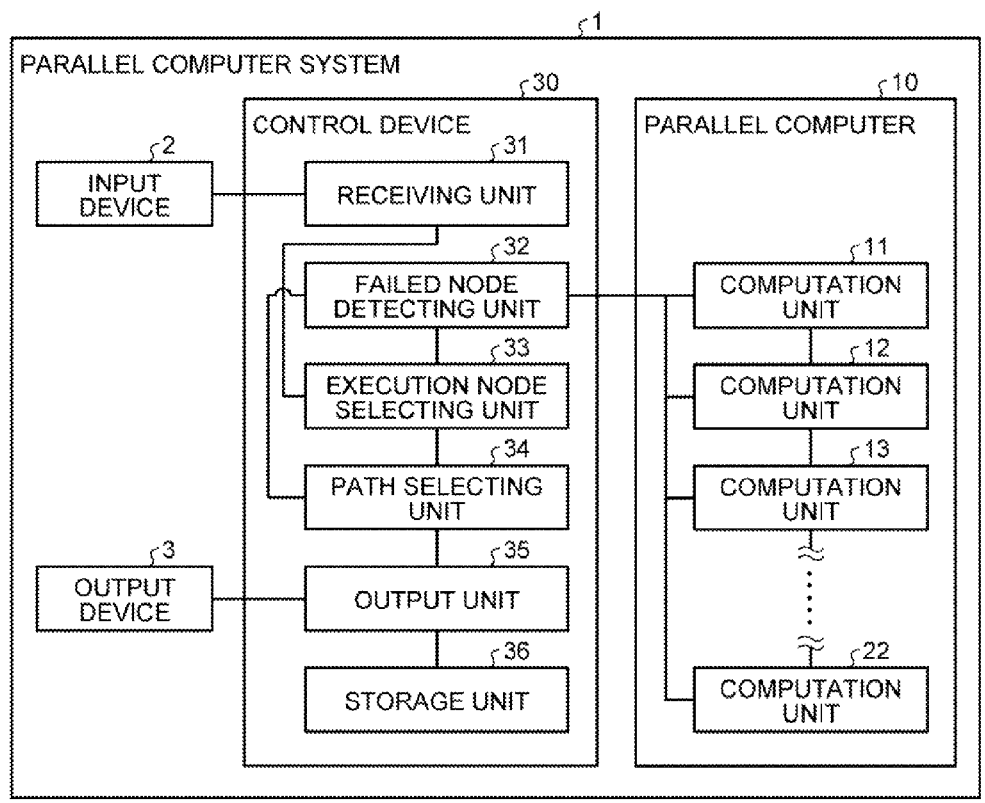
FIG. 1 is a diagram illustrating a parallel computer system according to a first embodiment.

In the first embodiment described below, an example of a parallel computer system that provides a one-dimensional direct interconnection network to a user will be described using FIG. 1. FIG. 1 is a diagram illustrating a parallel computer system according to the first embodiment.

As illustrated in FIG. 1, a parallel computer system 1 includes an input device 2, an output device 3, a parallel computer 10, and a control device 30. The parallel computer 10 includes plural computation units 11 to 22. The control device 30 includes a receiving unit 31, a failed node detecting unit 32, an execution node selecting unit 33, a path selecting unit 34, an output unit 35, and a storage unit 36.

Since each of the computation units 12 to 22 has the same configuration as that of the computation unit 11, the description will not be repeated. The input device 2 is an input device such as a keyboard or a mouse that is used to input an instruction from the user to the control device 30. The output device 3 is an output device such as a monitor or a printer that is used to display the process result by the control device 30.

The parallel computer 10 includes the plural computation units 11 to 22 and plural links that connect the computation units 11 to 22 to each other. In this case, each link is a path which connects the computation units adjacent to each other and includes plural paths which connect the plural computation nodes of the two computation units adjacent to each other in a one-to-one manner.

Figure 2:
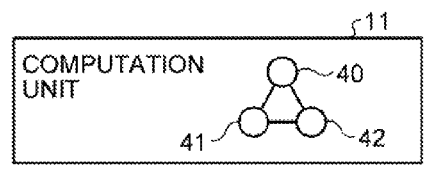
FIG. 2 is a diagram illustrating a computation unit according to the first embodiment.

Hereinafter, the computation units 11 to 22 that are included in the parallel computer 10 and the computation nodes that are included in the computation units 11 to 22 will be described. FIG. 2 is a diagram illustrating the computation unit according to the first embodiment. In an example illustrated in FIG. 2, each of the computation units 11 to 22 has three computation nodes 40 to 42. The computation nodes 40 to 42 are connected in a torus shape. That is, the computation nodes 40 to 42 are connected to each other. Since each of the computation nodes 41 and 42 has the same configuration as that of the computation node 40, the description will not be repeated.

Figure 3:
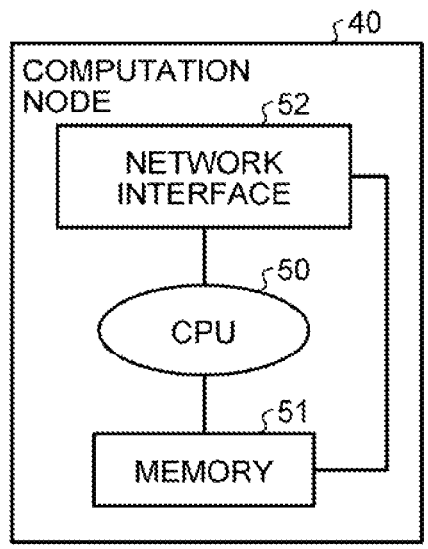
FIG. 3 is a diagram illustrating a computation node according to the first embodiment.

FIG. 3 is a diagram illustrating the computation node according to the first embodiment. In an example illustrated in FIG. 3, the computation node 40 has a central processing unit (CPU) 50, a memory 51, and a network interface 52. In this case, the CPU 50 is an operation device that executes a program mapped to the computation node 40. The memory 51 is a memory that stores data used when the CPU 50 executes the program.

The network interface 52 is a device that performs communication with the other nodes. Specifically, the network interface 52 performs communication with the network interfaces of the other computation nodes 41 and 42 through the link. In addition, the network interface 52 performs communication with the network interface of the computation node at the position corresponding to the computation node 40, among the computation nodes of the computation unit 12, through the link.

Figure 4:
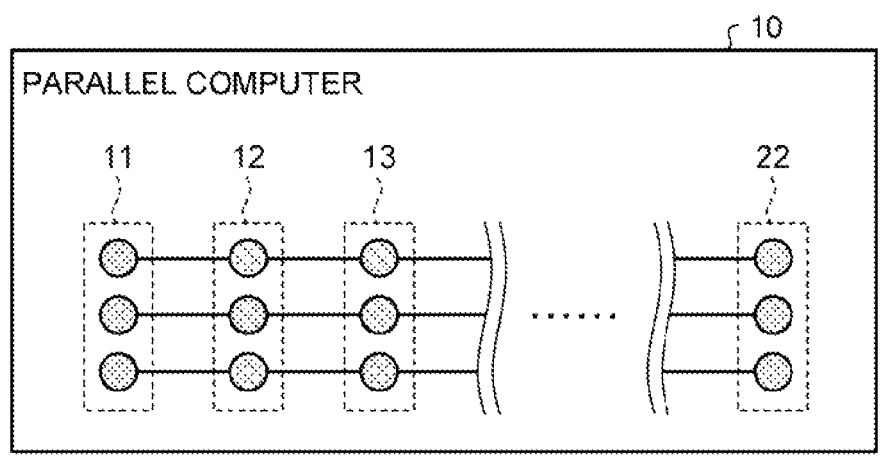
FIG. 4 is a diagram illustrating a link of a parallel computer according to the first embodiment.

That is, the link that connects the computation units 11 to 22 has plural paths which connect the computation nodes of the computation units adjacent to each other in a one-to-one manner. FIG. 4 is a diagram illustrating the link of the parallel computer of the linear topology according to the first embodiment. In an example illustrated in FIG. 4, the plural computation nodes of the computation units 11 to 22 and the plural computation nodes of the computation units adjacent to each other are connected in a one-to-one manner. That is, the link that connects the computation units adjacent to each other has three paths to transmit communication between the computation units adjacent to each other, when each of the computation units 11 to 22 has the three computation nodes.

Returning to FIG. 1, the control device 30 is a control device that controls the parallel computer 10. Specifically, the control device 30 receives designation of the number of computation nodes executing a program, from the user. When the control device 30 receives the designation of the number of computation nodes, the control device 30 determines the computation nodes that execute the program and assigns continuous numbers as the virtual coordinates to the determined computation nodes. At this time, the control device 30 assigns the continuous virtual coordinates to the computation nodes that are connected directly by the link and are adjacent to each other. Then, the control device 30 outputs information indicating which computation nodes will execute the program and the virtual coordinates assigned to the computation nodes.

The receiving unit 31 receives an instruction of the user which was entered through the input device 2. Specifically, the receiving unit 31 receives the number of computation nodes which were input by the user, through the input device 2. That is, the receiving unit 31 receives the number of computation nodes executing the program among the plural computation nodes of the parallel computer 10 from the user, through the input device 2. The receiving unit 31 notifies the execution node selecting unit 33 of the number of computation nodes received from the user.

The failed node detecting unit 32 detects a failed node where a failure has occurred, from the computation nodes of the parallel computer 10. For example, the failed node detecting unit 32 regularly transmits a signal to each computation node of the parallel computer 10 and detects the computation node where there is no response to the transmitted signal as the failed node. The failed node detecting unit 32 notifies the execution node selecting unit 33 and the path selecting unit 34 of the detected failed node.

A process of detecting the failed node by the failed node detecting unit 32 may be executed using other arbitrary methods. For example, each computation unit may have a failed node detecting device that detects the failed node according to whether the computation nodes in the computation unit are operated and the failed node detecting unit 32 may collect information related to a failure from the failed node detecting device of each computation unit.

The execution node selecting unit 33 selects the computation node executing the program from the computation nodes excluding the failed nodes included in the parallel computer 10, on the basis of the number of computation nodes needed to execute the program. Specifically, the execution node selecting unit 33 receives the notification of the number of computation nodes executing the program from the receiving unit 31. The execution node selecting unit 33 receives the notification of a failed node from the failed node detecting unit 32.

The execution node selecting unit 33 calculates the number of computation units executing the program, using the following Equation 1. In this case, "N" of Equation 1 indicates the number of computation nodes that execute the program, "m" indicates the number of computation nodes that are included in one computation unit, and "k" indicates the number of failed nodes. In addition, "ceiling" of Equation 1 indicates an operation that rounds a numerical value in parentheses up to the closest whole number.

$$n = \text{ceiling}((N+k)/m) \quad (1)$$

When the execution node selecting unit 33 calculates the number of computation units executing the program using Equation 1, the execution node selecting unit 33 selects the adjacent computation units of the calculated number. That is, the execution node selecting unit 33 selects the plural computation units that correspond to the computation units of the calculated number and are connected in series through the link. The execution node selecting unit 33 notifies the path selecting unit 34 of the selected plural computation units.

The path selecting unit 34 selects a path other than the path connected to the failed node from each link connecting the two adjacent computation units, with respect to the plural computation units having the computation nodes selected by the execution node selecting unit 33.

Specifically, the path selecting unit 34 receives the notification of the computation unit that is selected by the execution node selecting unit 33. The path selecting unit 34 receives the notification of the detected failed node, from the failed node detecting unit 32. The path selecting unit 34 selects the path used at the time of communication between the adjacent computation units, sequentially from the computation units connected to only one computation unit, that is, the computation units positioned at the ends of the plural computation units connected in a linear shape, among the notified plural computation units.

In this case, when the path selecting unit 34 selects the path used at the time of the communication between the adjacent computation units, the path selecting unit 34 executes a process to be described below. That is, the path selecting unit 34 selects the path used at the time of the communication between the adjacent computation units. The path selecting unit 34 selects the path that is used at the time of the communication between the computation units and is not connected to the failed node, while cyclically changing the selected path, such that the type of the same path is not continuous.

When the path selecting unit 34 selects all of the paths to connect the computation units, the path selecting unit 34 executes the following process and selects the connection path of the computation nodes of each computation unit. That is, the path selecting unit 34 determines the two computation nodes connected to the selected path between the adjacent computation units, with respect to the computation units other than both ends. The path selecting unit 34 selects a path that passes all of the non-failed computation nodes included in the computation units only once, using the determined computation nodes as both ends.

When the path selecting unit 34 selects the path between the computation units notified from the execution node selecting unit 33 and the connection path of each computation node of each computation unit, the path selecting unit 34 executes the following process. That is, the path selecting unit 34 assigns continuous numbers to computation nodes to follow the selected path and the connection path between the selected computation nodes, from the computation unit existing at one end to the computation unit existing at the other end.

That is, the path selecting unit 34 assigns continuous numbers as the virtual coordinates to the computation nodes other than the failed nodes notified from the failed node detecting unit 32 among the computation nodes of each computation unit notified from the execution node selecting unit 33, to perform one-stroke drawing. That is, the path selecting unit 34 assigns the virtual coordinates to directly connect the computation units selected by the execution node selecting unit 33 in a one-dimensional line type, to each computation node. The computation nodes that are connected directly in the one-dimensional line type become the computation nodes that are connected in series. Then, the path selecting unit 34 notifies the output unit 35 of information indicating association of each computation node and the virtual coordinates assigned to each computation node.

When the computation node to assign the virtual coordinates is notified from the path selecting unit 34, the output unit 35 generates information that is obtained by arranging the information indicating each computation node in order of the continuous virtual coordinates assigned to each computation node. The output unit 35 outputs the generated information through the output device 3. The output unit 35 stores the generated information in the storage unit 36.

The information that is stored in the storage unit 36 is used when a parallel computation program generated by the user is executed by the parallel computer 10. For example, the control device 30 generates a file that is referred to by a library at the time of executing a message passing interface (MPI) to acquire association of the virtual coordinates and the physical coordinates and stores the generated file in the storage unit 36. The parallel computation program includes plural process execution commands and the computation node that executes each process is designated by the virtual coordinates. In this case, the library refers to the information stored in the storage unit 36 and determines the computation node to which the virtual coordinates designated by the parallel computation program are assigned. The library allocates the process to the determined computation node.

For example, the receiving unit 31, the failed node detecting unit 32, the execution node selecting unit 33, the path selecting unit 34, and the output unit 35 constitute an electronic circuit. In this case, an integrated circuit such as an application specific integrated circuit (ASIC) and a field programmable gate array (FPGA) or an operation processing device such as a CPU and a micro processing unit (MPU) are applied as the electronic circuit.

The storage unit 36 is a semiconductor memory element such as a random access memory (RAM), a read only memory (ROM), and a flash memory or a storage device such as a hard disk and an optical disk.

Figure 5A:
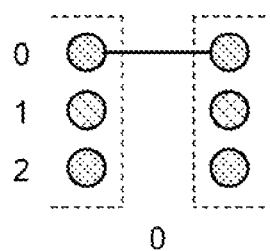
FIG. 5A is a diagram (1) illustrating an example of a path which connects computation units adjacent to each other.
Figure 5B:
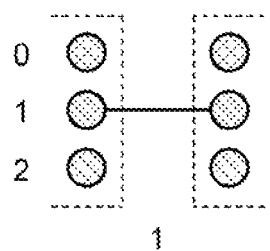
FIG. 5B is a diagram (2) illustrating an example of a path which connects computation units adjacent to each other.
Figure 5C:
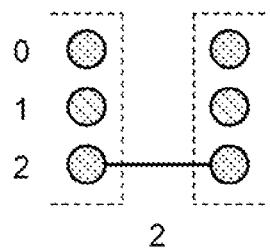
FIG. 5C is a diagram (3) illustrating an example of a path which connects computation units adjacent to each other.

Next, an example of a process that is executed by the control device 30 will be described using FIGS. 5A to 5C and 6A to 6G. Each of circles that are illustrated in FIGS. 5A to 5C and 6A to 6G illustrates one computation node. Each of dotted lines that surround the plural computation nodes in FIGS. 5A to 5C illustrates one computation unit. Each of solid lines that surround the plural computation nodes in FIGS. 6A to 6G illustrates one computation unit. Each of circles to which an x-mark is added in FIGS. 6A to 6G illustrates a failed node.

In the description below, the control device 30 adds numbers "0", "1", and "2" to the computation nodes of the computation units 11 to 22 and adds numbers "0" to "11" to the computation units 11 to 22. The control device 30 illustrates each computation node of the parallel computer 10 by a combination of the number added to each computation node and the number added to each computation unit. For example, the control device 30 illustrates the computation node having the number "2" in the computation unit having the number "0" by the physical coordinates "(0, 2)".

FIG. 5A is a diagram (1) illustrating an example of a path to connect the computation units adjacent to each other. As illustrated in FIG. 5A, a path to connect the computation nodes having the number "0" among the computation nodes of the computation units adjacent to each other is set as a path of a type "0". FIG. 5B is a diagram (2) illustrating an example of a path to connect the computation units adjacent to each other. As illustrated in FIG. 5B, a path to connect the computation nodes having the number "1" among the computation nodes of the computation units adjacent to each other is set as a path of a type "1". FIG. 5C is a diagram (3) illustrating an example of a path to connect the computation units adjacent to each other. As illustrated in FIG. 5C, a path to connect the computation nodes having the number "2" among the computation nodes of the computation units adjacent to each other is set as a path of a type "2".

Figure 6A:
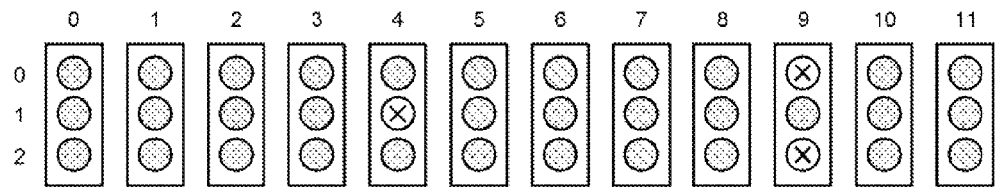
FIG. 6A is a diagram (1) illustrating an example of a process executed by a control device according to the first embodiment.

FIG. 6A is a diagram (1) illustrating an example of a process that is executed by the control device according to the first embodiment. For example, the control device 30 receives the number "32" of computation nodes executing the program from the user, through the input device 2. In this case, the control device 30 detects the failed computation node from the computation nodes of the parallel computer 10. In an example illustrated in FIG. 6A, the control device 30 detects that the computation nodes positioned at the physical coordinates "(4, 1)", "(9, 0)", and "(9, 2)" are the failed nodes.

The control device 30 solves Equation 1 by "N=32", "m=3", and "k=3" and calculates the number "n=12" of computation units executing the program. The control device 30 selects the computation units 11 to 22 of the parallel computer 10 as the 12 computation units having the numbers "0" to "11" to be connected in series.

Figure 6B:
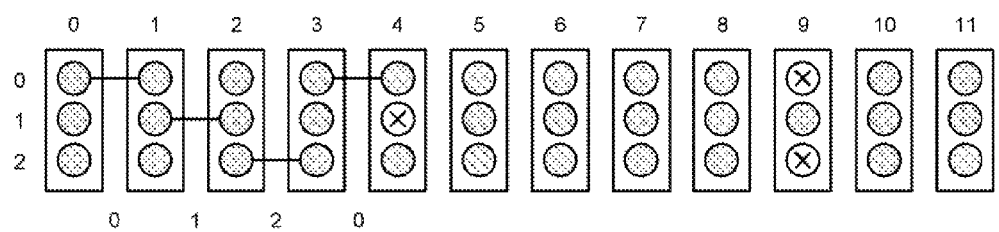
FIG. 6B is a diagram (2) illustrating an example of a process executed by the control device according to the first embodiment.

FIG. 6B is a diagram (2) illustrating an example of a process that is executed by the control device according to the first embodiment. When the control device 30 selects the computation unit to execute the program, as illustrated in FIG. 6B, the control device 30 selects the paths sequentially from the computation units having the number "0", while cyclically changing the type of the path to relay the communication between the computation units adjacent to each other, such that the same type is not continuous.

In an example illustrated in FIG. 6B, the control device 30 selects the path of the type "0" between the computation unit having the number "0" and the computation unit having the number "1" and selects the path of the type "1" between the computation unit having the number "1" and the computation unit having the number "2". The control device 30 selects the path of the type "2" between the computation unit having the number "2" and the computation unit having the number "3" and reselects the path of the type "0" between the computation unit having the number "3" and the computation unit having the number "4".

Figure 6C:
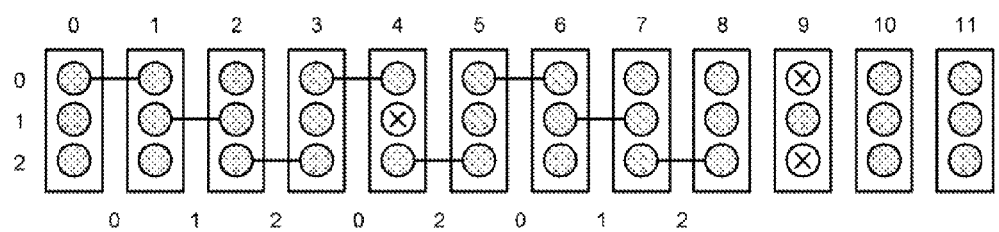
FIG. 6C is a diagram (3) illustrating an example of a process executed by the control device according to the first embodiment.

FIG. 6C is a diagram (3) illustrating an example of a process that is executed by the control device according to the first embodiment. As illustrated in FIG. 6C, the computation node having the number "1" in the computation unit having the number "4", that is, the computation node illustrated by the physical coordinates "(1, 4)" is the failed node. For this reason, the control device 30 excludes the path of the type "1" between the computation unit having the number "4" and the computation unit having the number "5" from selection objects. Since the path of the type "0" is selected between the computation unit having the number "3" and the computation unit having the number "4", the control device 30 excludes the path of the type "0" from the selection objects.

As a result, the control device 30 selects the path of the type "2" between the computation unit having the number "4" and the computation unit having the number "5". Then, the control device 30 selects the path between the computation units, while cyclically changing the type of the path again.

The control device 30 does not select the paths of the different types between the computation unit having the number "9" and having the two failed nodes and the computation unit having the number "8" and the computation unit having the number "10" adjacent to the computation unit having the number "9". As such, when the plural failed nodes exist and the paths of the different types is not selected between the computation units adjacent to each other, the control device 30 selects the path of the same type.

Figure 6D:
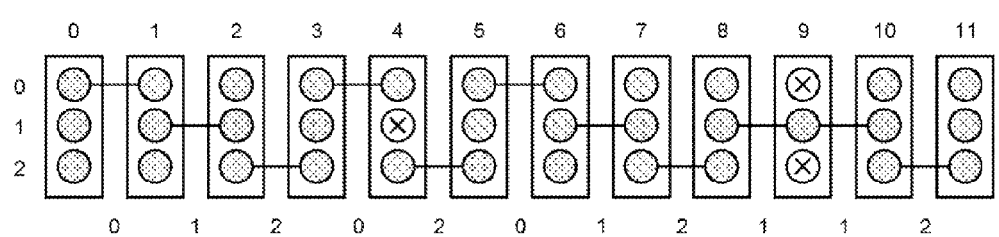
FIG. 6D is a diagram (4) illustrating an example of a process executed by the control device according to the first embodiment.

That is, as illustrated in FIG. 6D, the control device 30 selects the path of the type "1" between the computation unit having the number "8" and the computation unit having the number "9" and between the computation unit having the number "9" and the computation unit having the number "10". Then, the control device 30 selects the path of the type "2" between the computation unit having the number "10" and the computation unit having the number "11". FIG. 6D is a diagram (4) illustrating an example of a process that is executed by the control device according to the first embodiment.

Figure 6E:
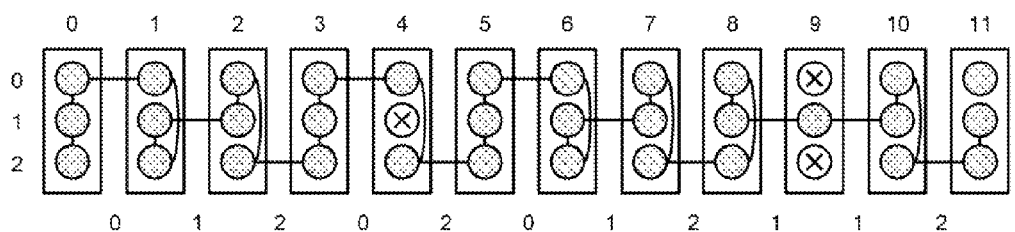
FIG. 6E is a diagram (5) illustrating an example of a process executed by the control device according to the first embodiment.

FIG. 6E is a diagram (5) illustrating an example of a process that is executed by the control device according to the first embodiment. As illustrated in FIG. 6E, when the control device 30 selects the types of the paths between the computation units having the numbers from "0" to "11", the control device 30 selects the paths in the computation units having the numbers from "1" to "10". Specifically, the control device 30 selects the paths in the computation units to pass the other computation nodes only once, using the computation nodes connected to the path selected between each of the computation units having the numbers from "1" to "10" and the computation units adjacent to each computation unit in the computation units having the numbers from "1" to "10" as both ends.

Figure 6F:
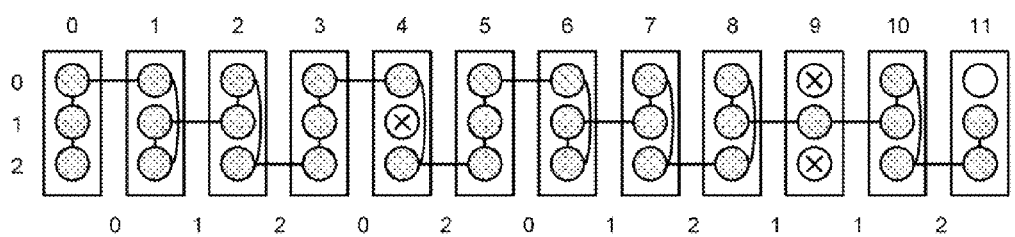
FIG. 6F is a diagram (6) illustrating an example of a process executed by the control device according to the first embodiment.

FIG. 6F is a diagram (6) illustrating an example of a process that is executed by the control device according to the first embodiment. As illustrated in FIG. 6F, when the control device 30 selects the path in each computation unit, the control device 30 identifies the 32 computation nodes that are connected in series by the path selected from the computation unit having the number "0" to the computation unit having the number "11".

Figure 6G:
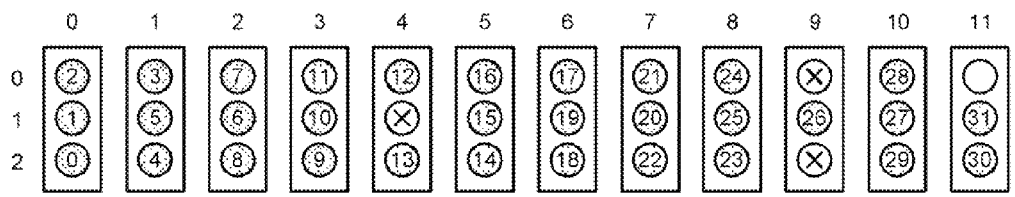
FIG. 6G is a diagram (7) illustrating an example of a process executed by the control device according to the first embodiment.

FIG. 6G is a diagram (7) illustrating an example of a process that is executed by the control device according to the first embodiment. As illustrated in FIG. 6G, the control device 30 assigns the numbers "0" to "31" as the virtual coordinates to the identified 32 computation nodes. That is, the control device 30 assigns the continuous virtual coordinates to the plural computation nodes that are connected directly to the adjacent computation nodes by the selected path and are connected in series.

The control device 30 generates a file (machine file) where the physical coordinates to which the virtual coordinates are assigned are described in order of the virtual coordinates. The control device 30 outputs the generated file through the output device 3 and stores the generated file.

Next, an example of a flow of a process that is executed by the control device 30 will be described using FIG. 7. FIG. 7 is a flowchart illustrating an example of a flow of a process that is executed by the control device according to the first embodiment. In the description below, the control device 30 selects the n computation units as the computation units executing the program. In the example illustrated in FIG. 7, the control device 30 starts the process, when the control device 30 receives an input of the number "N" of computation nodes executing the program as a trigger, through the input device 2.

First, the control device 30 selects the computation units having the continuous numbers "0" to "n−1" executing the program, using Equation 1 (step S101). Next, the control device 30 determines types CT(0) to CT(n−2) of paths between the computation units (step S102). CT(x) is a symbol that illustrates the path selected by the control device 30, between the computation unit having the number "x" and the computation unit having the number "x+1".

Next, the control device 30 selects the paths in the computation units having the numbers "1" to "n−2" (step S103). Next, the control device 30 selects the path in the computation unit having the number "0" and the computation unit having the number "n−1", that is, these are the computation units of both ends (step S104). The control device 30 assigns virtual coordinates to each computation node along the selected path (step S105). Then, the control device 30 outputs and stores a file where the physical coordinates of each computation node are described in order of the virtual coordinates (step S106) and ends the process.

Next, the process (step S102 in FIG. 7) of selecting the type of the path by the control device 30 will be described in detail using FIG. 8. FIG. 8 is a flowchart illustrating an example of a process of selecting a type of a path. In FIG. 8, "F" illustrates a collection of the physical coordinates of the failed nodes.

First, the control device 30 initializes a parameter "x" and a parameter "u" and sets "x=0" and "u=0" (step S201). Next, the control device 30 sets a "counter" value to the number "m" of computation nodes included in one computation unit (step S202). Next, the control device 30 calculates a residual value that is obtained by dividing "u+1" by "m" and sets the calculated value as a new value of "u" (step S203).

The control device 30 determines whether the physical coordinates "(x, u)" or "(x+1, u)" of the computation node are included in "F" (step S204). Then, when it is determined that the physical coordinates "(x, u)" or "(x+1, u)" are included in "F" (Yes in step S204), the control device 30 executes the following process. That is, the control device 30 subtracts 1 from the "counter" value and determines whether a new "counter" value is more than "0" (step S205).

When it is determined that the new "counter" value is more than "0" (Yes in step S205), the control device 30 executes the process of step S203 again. When it is determined that the new "counter" value reaches "0" (No in step S205), the control device 30 determines that the path is not selected, controls the execution node selecting unit 33 to select different computation units, and repeats the process that follows. When it is determined that the path is not selected, the control device 30 may notify the user of an error end, through the output device 3 (step S206).

Meanwhile, when it is determined that the physical coordinates "(x, u)" or "(x+1, u)" are not included in "F" (No in step S204), the control device 30 sets "CT(x)" to "u" (step S207). That is, the control device 30 selects the path of the type "u" between the "x"-th computation unit and the "x+1"-th computation unit.

Next, the control device 30 sets a value obtained by adding "1" to the value of "x" to a new value of "x" and determines whether the new value of "x" is "n−2" or less (step S208). That is, the control device 30 determines whether the paths between all of the computation units executing the program have been selected. Then, when it is determined that the new value of "x" is "n−2" or less, that is, when it is determined that the paths between all of the computation units executing the program have not been selected (Yes in step S208), the control device 30 executes step S202 again. When it is determined that the new value of "x" is not "n−2" or less, that is, when it is determined that the paths between all of the computation units executing the program have been selected, the control device 30 ends the process of selecting the type of the path.

Effect of First Embodiment

As described above, the control device 30 detects the failed node from all of the computation nodes included in the parallel computer 10. The control device 30 selects the computation node executing the program from the computation nodes that are included in the parallel computer 10 and are the computation nodes other than the detected failed node, on the basis of the number of computation nodes needed to execute the program.

The control device 30 selects the path connected to the computation nodes other than the detected failed node, between the adjacent computation units including the selected computation nodes. For this reason, the control device 30 can map each area obtained by dividing the computation space to be simulated to each computation node having the appropriate position relation.

That is, the control device 30 selects the path to relay the communication between the computation nodes other than the failed node among the computation nodes of the parallel computer 10, such that the computation nodes constitute the one-dimensional direct interconnection network. For this reason, the control device 30 can provide a one-dimensional direct interconnection network that has plural computation nodes and secures that the communication between the adjacent computation nodes is efficiently performed. As a result, the parallel computer system 1 can map each divided area to each computation node having the same position relation as that of each area, when the computation space is divided into one-dimensional areas having a linear shape. Therefore, the entire system performance can be maintained, even when the failed node exists.

The parallel computer system 1 has plural computation units 11 to 22 which are connected in series through the link. Each of the computation units 11 to 22 has plural computation nodes which are connected to each other. The control device 30 selects the computation nodes executing the program and selects the path between the selected computation nodes to perform one-stroke drawing.

That is, the control device 30 selects a path that is not connected to a failed node, among the paths between the continuous computation units. The control device 30 selects a path in the computation unit that passes each computation node only once, using the computation nodes connected to the path between the selected computation units as both ends, with respect to each computation unit. Then, the control device 30 assigns the continuous virtual node numbers to the computation nodes to be directly connected, according to the selected path between the computation units and the selected path in the computation unit. For this reason, the parallel computer system 1 can provide a direct interconnection network having the one-dimensional topology to the user, even when a failed node exists.

When the control device 30 selects the path from the links between the computation units 11 to 22, the control device 30 cyclically selects a path of the different type. For this reason, the parallel computer system 1 can efficiently perform communication between the computation nodes.

That is, when the control device 30 continuously selects the path of the same type, the communication of the plural computation nodes that are included in one computation unit is completely relayed by one computation node and communication efficiency is deteriorated. However, when the two or more non-failed computation nodes exist in the certain computation unit, the control device 30 selects the paths of the different types between the computation unit and the adjacent computation unit. As a result, the parallel computer system 1 prevents the communication of the plural computation nodes included in one computation unit from being relayed by one computation node and secures that the computation nodes adjacent to each other with the virtual node numbers have direct paths. Therefore, the communication between computation nodes can be efficiently performed and the program can be efficiently executed in each computation node.

[b] Second Embodiment

Figure 9:
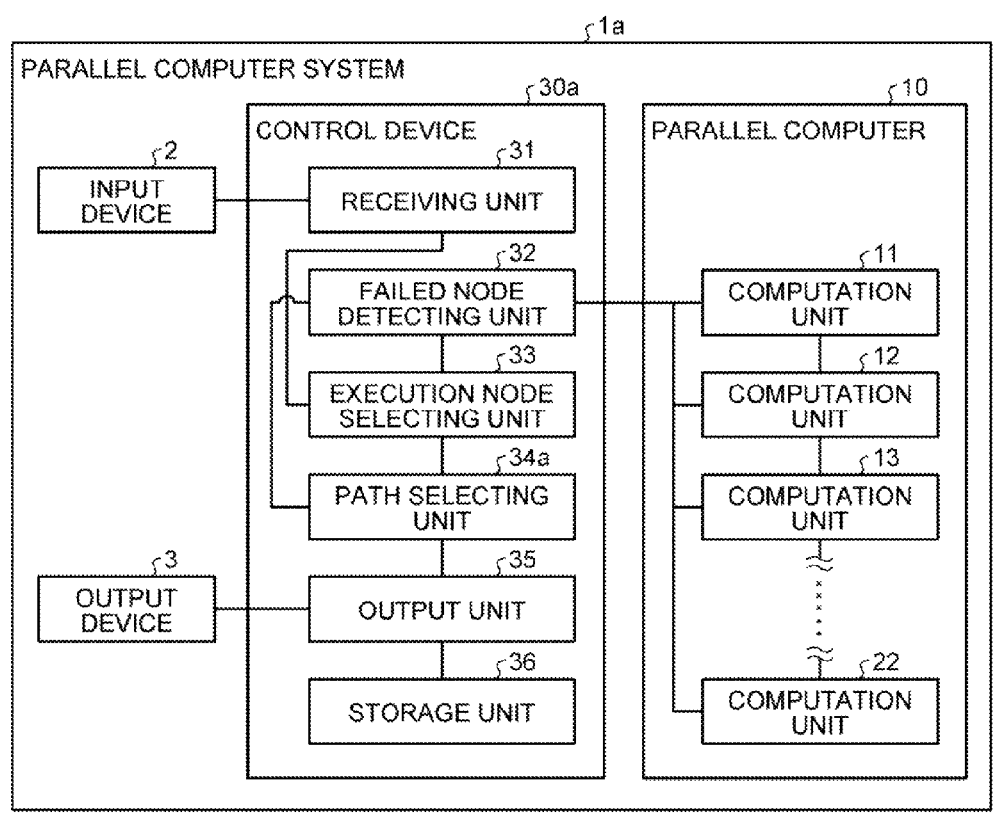
FIG. 9 is a diagram illustrating a parallel computer system according to a second embodiment.

In the second embodiment, a parallel computer system 1a that provides a network of a direct interconnection network having one-dimensional torus topology to a user will be described. FIG. 9 is a diagram illustrating a parallel computer system according to the second embodiment. In an example illustrated in FIG. 9, the parallel computer system 1a includes an input device 2, an output device 3, a parallel computer 10, and a control device 30a. The parallel computer 10 includes plural computation units 11 to 22. The control device 30a includes a receiving unit 31, a failed node detecting unit 32, an execution node selecting unit 33, a path selecting unit 34a, an output unit 35, and a storage unit 36.

That is, the parallel computer system 1a is different from the parallel computer system 1 according to the first embodiment in only a process executed by the path selecting unit 34a corresponding to the path selecting unit 34 according to the first embodiment. For this reason, the input device 2, the output device 3, the parallel computer 10, the receiving unit 31, the failed node detecting unit 32, the execution node selecting unit 33, the output unit 35, and the storage unit 36 execute the same processes as those of the individual units having the same reference numerals in the first embodiment. Therefore, the description of the individual units will not be repeated.

The path selecting unit 34a selects two paths not connected to a failed node as an outgoing path and a returning path, from each link between the computation units having plural computation nodes selected by the execution node selecting unit 33. The path selecting unit 34a selects a connection path between the computation nodes connected to the outgoing path and a connection path between the computation nodes connected to the returning path which passes the non-failed computation nodes only once, with respect to the computation units other than both ends.

The path selecting unit 34a selects a connection path that passes the other non-failed computation nodes only once, using the computation node connected to the outgoing path and the computation node connected to the returning path as both ends, with respect to the computation units of both ends. Then, the path selecting unit 34a assigns the continuous numbers as the virtual coordinates to the computation nodes to be directly connected, to follow for each path selected between the computation units and each path selected in the computation units.

That is, the path selecting unit 34a assigns the virtual coordinates to directly connect the computation nodes selected by the execution node selecting unit 33 in the one-dimensional torus type, to each computation node. The computation nodes that are connected directly in the one-dimensional torus type are connected in a ring shape. For this reason, even when the failed node exists in the parallel computer 10, the control device 30a can provide a system where the computation nodes of the number designated by the user are connected directly in the torus type, to the user.

Figure 10A:
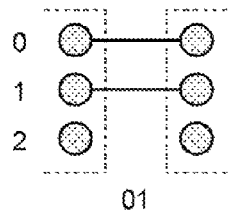
FIG. 10A is a diagram (1) illustrating an example of a path which connects computation units adjacent to each other in the second embodiment.

Next, an example of a type of a path that is selected from the link between the computation units by the control device 30a will be described using FIGS. 10A to 10I. FIG. 10A is a diagram (1) illustrating an example of a path to connect the computation units adjacent to each other in the second embodiment. As illustrated in FIG. 10A, a type of a path to connect the computation nodes having the number "0" and a type of a path to connect the computation nodes having the number "1" among the computation nodes of the computation units adjacent to each other are set to a type "01".

Figure 10B:
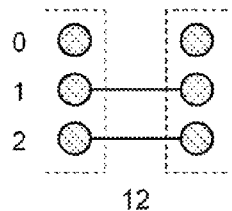
FIG. 10B is a diagram (2) illustrating an example of a path which connects computation units adjacent to each other in the second embodiment.
Figure 10C:
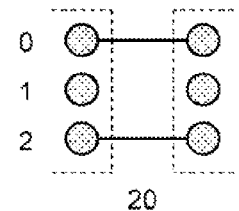
FIG. 10C is a diagram (3) illustrating an example of a path which connects computation units adjacent to each other in the second embodiment.

FIG. 10B is a diagram (2) illustrating an example of a path to connect the computation units adjacent to each other in the second embodiment. As illustrated in FIG. 10B, a type of a path to connect the computation nodes having the number "1" and a type of a path to connect the computation nodes having the number "2" among the computation nodes of the computation units adjacent to each other are set to a type "12". FIG. 10C is a diagram (3) illustrating an example of a path to connect the computation units adjacent to each other in the second embodiment. As illustrated in FIG. 10C, a type of a path to connect the computation nodes having the number "0" and a type of a path to connect the computation nodes having the number "2" among the computation nodes of the computation units adjacent to each other are set to a type "20".

Figure 10D:
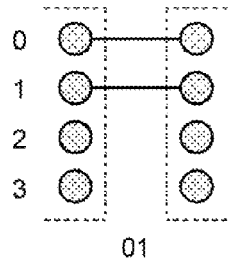
FIG. 10D is a diagram (4) illustrating an example of a path which connects computation units adjacent to each other in the second embodiment.

In FIGS. 10A to 10C, the example of the case where each computation unit has the three computation nodes is described. However, each computation unit may have four or more computation nodes. In this case, a type of a path that is selected from the link between the computation units is as follows. FIG. 10D is a diagram (4) illustrating an example of a path to connect the computation units adjacent to each other in the second embodiment. As illustrated in FIG. 10D, a type of a path to connect the computation nodes having the number "0" and a type of a path to connect the computation nodes having the number "1" among the computation nodes of the computation units adjacent to each other are set to a type "01".

Figure 10E:
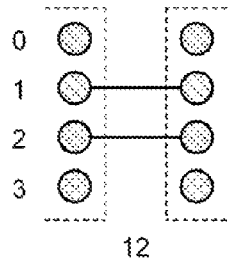
FIG. 10E is a diagram (5) illustrating an example of a path which connects computation units adjacent to each other in the second embodiment.
Figure 10F:
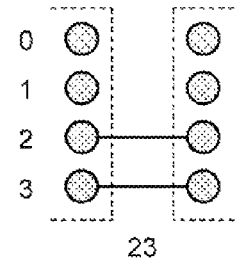
FIG. 10F is a diagram (6) illustrating an example of a path which connects computation units adjacent to each other in the second embodiment.

FIG. 10E is a diagram (5) illustrating an example of a path to connect the computation units adjacent to each other in the second embodiment. As illustrated in FIG. 10E, a type of a path to connect the computation nodes having the number "1" and a type of a path to connect the computation nodes having the number "2" among the computation nodes of the computation units adjacent to each other are set to a type "12". FIG. 10F is a diagram (6) illustrating an example of a path to connect the computation units adjacent to each other in the second embodiment. As illustrated in FIG. 10F, a type of a path to connect the computation nodes having the number "2" and a type of a path to connect the computation units having the number "3" among the computation nodes of the computation units adjacent to each other are set to a type "23".

Figure 10G:
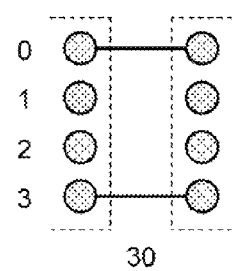
FIG. 10G is a diagram (7) illustrating an example of a path which connects computation units adjacent to each other in the second embodiment.
Figure 10H:
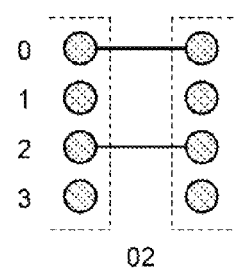
FIG. 10H is a diagram (8) illustrating an example of a path which connects computation units adjacent to each other in the second embodiment.

FIG. 10G is a diagram (7) illustrating an example of a path to connect the computation units adjacent to each other in the second embodiment. As illustrated in FIG. 10G, a type of a path to connect the computation nodes having the number "0" and a type of a path to connect the computation nodes having the number "3" among the computation nodes of the computation units adjacent to each other are set to a type "30". FIG. 10H is a diagram (8) illustrating an example of a path to connect the computation units adjacent to each other in the second embodiment. As illustrated in FIG. 10H, a type of a path to connect the computation nodes having the number "0" and a type of a path to connect the computation nodes having the number "2" among the computation nodes of the computation units adjacent to each other are set to a type "02".

Figure 10I:
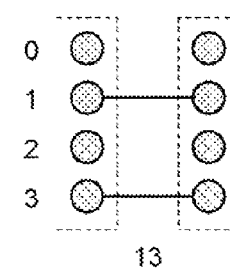
FIG. 10I is a diagram (9) illustrating an example of a path which connects computation units adjacent to each other in the second embodiment.

FIG. 10I is a diagram (9) illustrating an example of a path to connect the computation units adjacent to each other in the second embodiment. As illustrated in FIG. 10I, a type of a path to connect the computation nodes having the number "1" and a type of a path to connect the computation nodes having the number "3" among the computation nodes of the computation units adjacent to each other are set to a type "13".

Figure 11A:
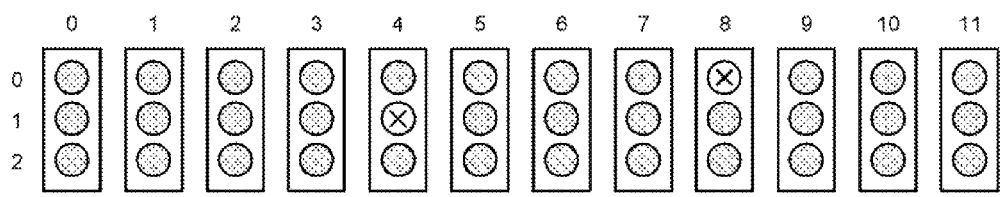
FIG. 11A is a diagram (1) illustrating an example of a process executed by a control device according to the second embodiment.

Next, a process of selecting a path by the control device 30a will be described using FIGS. 11A to 11F. FIG. 11A is a diagram (1) illustrating an example of a process that is executed by the control device according to the second embodiment. For example, the control device 30a receives the number "32" of computation nodes executing the program from the user, through the input device 2.

In this case, the control device 30a selects the computation units 11 to 22 as the computation units to assign the virtual coordinates, and assigns numbers "0" to "11" to the computation units. The control device 30a assigns the numbers "0" to "2" to the computation nodes of the computation units 11 to 22. The control device 30a confirms an operation of each computation node and detects that the computation nodes of the physical coordinates "(4, 1)" and "(8, 0)" are the failed nodes.

Figure 11B:
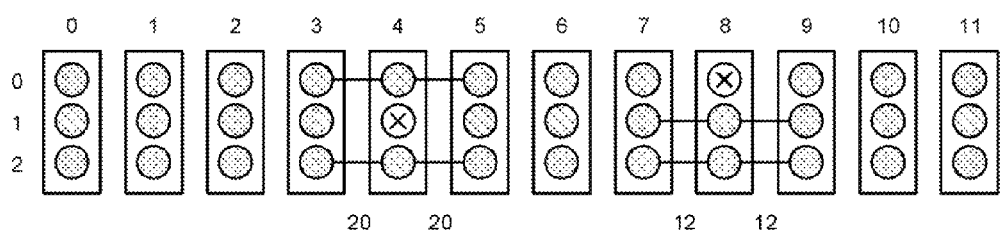
FIG. 11B is a diagram (2) illustrating an example of a process executed by the control device according to the second embodiment.

FIG. 11B is a diagram (2) illustrating an example of a process that is executed by the control device according to the second embodiment. First, the control device 30a identifies the computation unit including the detected failed node and having the number "4" and the computation unit having the number "8". The control device 30a selects a type of a path between the identified computation unit having the number "4" and the computation unit adjacent to the computation unit having the number "4".

That is, the control device 30a selects a path of a type "20" between the computation unit having the number "4" and the computation unit having the number "3" adjacent to the computation unit having the number "4" and between the computation unit having the number "4" and the computation unit having the number "5" adjacent to the computation unit having the number "4". In addition, the control device 30a selects a path of a type "12" between the computation unit having the number "8" and the computation unit having the number "7" adjacent to the computation unit having the number "8" and between the computation unit having the number "8" and the computation unit having the number "9" adjacent to the computation unit having the number "8". In an example illustrated in FIGS. 11A to 11F, since each computation unit has the "3" computation nodes, a type of a path that is selected between the computation unit having one failed node and the adjacent computation unit can be determined as illustrated in FIGS. 11A to 11F.

Figure 11C:
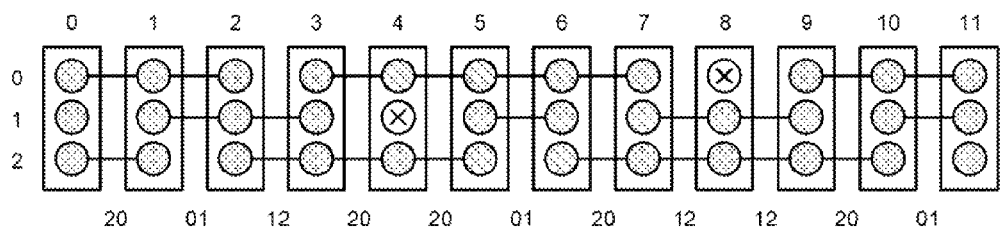
FIG. 11C is a diagram (3) illustrating an example of a process executed by the control device according to the second embodiment.

FIG. 11C is a diagram (3) illustrating an example of a process that is executed by the control device according to the second embodiment. When the control device 30a selects the type of the path between the computation unit having the failed node and the adjacent computation unit, the control device 30a selects a type of a path to relay the communication between the computation unit and the adjacent computation unit, sequentially from the computation unit having the number "0", while cyclically changing the type of the path.

In an example illustrated in FIG. 11C, the control device 30a selects a path of a type "20" between the computation unit having the number "0" and the computation unit having the "1" and selects a path of a type "01" between the computation unit having the number "1" and the computation unit having the number "2". The control device 30a selects a path of a type "12" between the computation unit having the number "2" and the computation unit having the number "3". The control device 30a cyclically selects a type of a path between the other computation units and selects a type of a path between all of the computation units having the computation nodes selected by the execution node selecting unit 33.

Figure 11D:
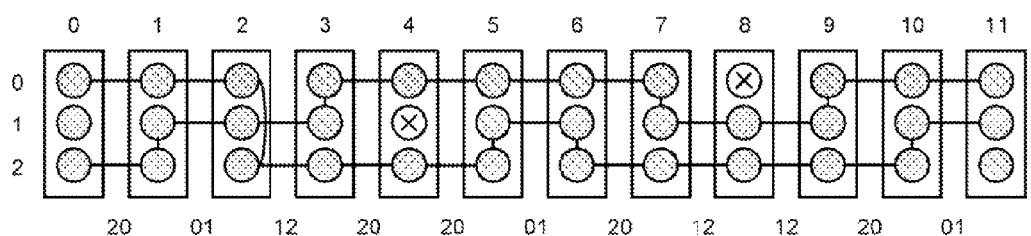
FIG. 11D is a diagram (4) illustrating an example of a process executed by the control device according to the second embodiment.

FIG. 11D is a diagram (4) illustrating an example of a process that is executed by the control device according to the second embodiment. As illustrated in FIG. 11D, when the control device 30a selects the type of the path between all of the computation units having the computation nodes selected by the execution node selecting unit 33, the control device 30a selects a path in each computation unit.

Specifically, when the type of the path selected with respect to each computation unit other than both ends can be represented by "ij" and "jk" ("i≠j≠k"), the control device 30a selects a path to connect the computation node having the number "i" and the computation node having the number "k". When the types of the paths selected between the individual computation units and the adjacent computation units are the same, the control device 30a determines that there is no path to connect the computation nodes in the computation units.

Figure 11E:
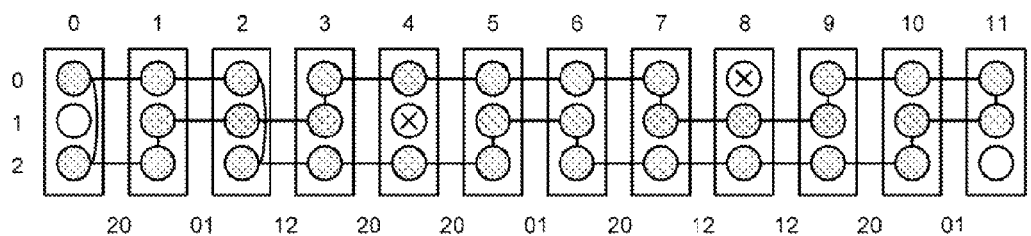
FIG. 11E is a diagram (5) illustrating an example of a process executed by the control device according to the second embodiment.

FIG. 11E is a diagram (5) illustrating an example of a process that is executed by the control device according to the second embodiment. As illustrated in FIG. 11E, when the control device 30a selects a path between the adjacent computation units and a path to connect the individual computation nodes in the computation units with respect to each computation unit other than both ends, the control device 30a selects a path to connect the computation nodes in the computation units of both ends. In an example illustrated in FIG. 11E, since the number of computation nodes designated by the user is 32, the control device 30a selects a path excluding the two computation nodes in the computation unit having the number "0" and the computation unit having the number "11".

Figure 11F:
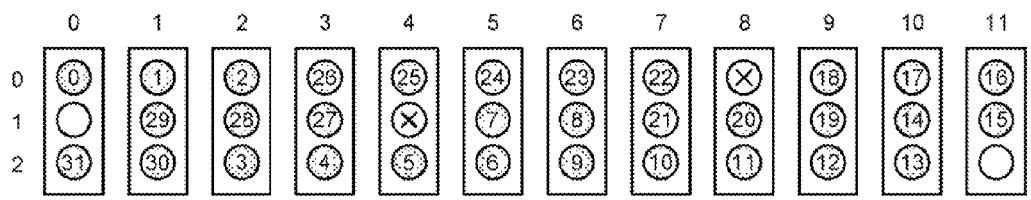
FIG. 11F is a diagram (6) illustrating an example of a process executed by the control device according to the second embodiment.

FIG. 11F is a diagram (6) illustrating an example of a process that is executed by the control device according to the second embodiment. As illustrated in FIG. 11F, when the control device 30a selects each path between the adjacent computation units and a path to connect the computation nodes in each computation unit, the control device 30a assigns the continuous number as the virtual coordinates to each computation node to follow the selected path. Then, the control device 30a outputs and stores a file where the physical coordinates of each computation node are arranged in order of the virtual coordinates.

Even when the "four" or more computation nodes to be connected to each other exist in one computation unit, the control device 30a executes the above-described process and can appropriately assign the virtual coordinates. In this case, when the type of the path selected with respect to each computation unit other than both ends can be represented by "ij" and "jk" ("i≠j≠k"), the control device 30a selects a path to pass all of the computation nodes having the numbers other than the numbers "i", "j", and "k" and connect the computation node having the number "i" and the computation node having the number "k". When the type of the selected path can be represented by "ij" and "kl" ("i≠j≠k≠l"), the control device 30a selects the paths that connect the computation nodes having the numbers "i" and "k" and connect the computation nodes having the numbers "j" and "l" or connect the computation nodes having the numbers "i" and "l" and connect the computation nodes having the numbers "j" and "k". However, the control device 30a selects a path to pass all of the computation nodes having the numbers other than the numbers "i", "j", "k", and "l".

When one computation unit has plural failed nodes, if the two computation units having the failed nodes are adjacent to each other or are exist with one computation unit interposed therebetween, the control device 30a may not select the type of the path. Hereinafter, a specific example will be described using FIGS. 12A to 12C.

Figure 12A:
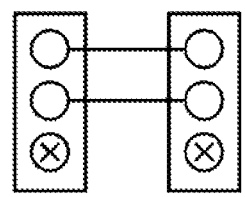
FIG. 12A is a diagram (1) illustrating an example of a case where a type of a path is not selected.

FIG. 12A is a diagram (1) illustrating an example of the case where a type of a path is not selected. As illustrated in FIG. 12A, even when the two computation units having the failed nodes are adjacent to each other, if the two failed nodes have the same number, the control device 30a can appropriately select the path.

Figure 12B:
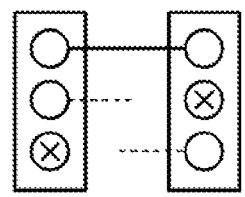
FIG. 12B is a diagram (2) illustrating an example of a case where a type of a path is not selected.

FIG. 12B is a diagram (2) illustrating an example of the case where a type of a path is not selected. As illustrated in FIG. 12B, when the computation units having the failed nodes of the different numbers are adjacent to each other, the control device 30a can select only either the outgoing path or the returning path. In this case, the control device 30a returns an error to the user and notifies the user that the virtual coordinates is not assigned.

When the parallel computer 10 has the plural computation units, the control device 30a may select plural computation units positioned in a new range and sequentially select paths with respect to the selected plural computation units.

Figure 12C:
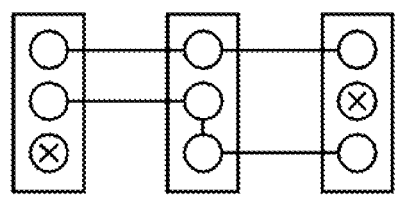
FIG. 12C is a diagram (3) illustrating an example of a case where a type of a path is not selected.

FIG. 12C is a diagram (3) illustrating an example of the case where a type of a path is not selected. In an example illustrated in FIG. 12C, the computation units having the failed nodes of the different numbers are adjacent to each other with one computation unit interposed therebetween. In this case, the control device 30a can select a path to connect all of the computation nodes in the central computation unit.

Figure 12D:
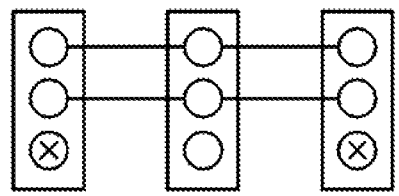
FIG. 12D is a diagram (4) illustrating an example of a case where a type of a path is not selected.

FIG. 12D is a diagram (4) illustrating an example of the case where a type of a path is not selected. In an example illustrated in FIG. 12D, the computation units having the failed nodes of the same number are adjacent to each other with one computation unit interposed therebetween. In this case, the control device 30a does not select a path to connect all of the computation nodes in the central computation unit. In this case, the control device 30a returns an error to the user and notifies the user that the virtual coordinates is not assigned. If the computation node of the central computation unit at the same position is handled as the failed node, one computation node is wasted. However, the virtual coordinates can be assigned.

In the above-described examples, after selecting the path with respect to the computation unit having the failed node, the control device 30a selects the failed nodes with respect to the other computation units. However, the embodiment is not limited thereto and the control device 30a may sequentially select the paths of the computation units, sequentially from the computation unit existing at one end to the computation unit existing at the other end, similar to the control device 30.

Flow of a Process of the Control Device 30a

Next, a flow of a process of selecting a type of a path by the control device 30a will be described using FIGS. 13 and 14. FIG. 13 is a flowchart (1) illustrating an example of a process of selecting a type of a path by the control device according to the second embodiment. The control device 30a executes the same process as the control device 30 illustrated in FIG. 7 and executes the process illustrated in FIGS. 13 and 14 as the process corresponding to step S102 of FIG. 7.

First, the control device 30a determines whether the process of steps S302 and S303 is executed with respect to all of the computation units having the failed nodes (step S301). When it is determined that the process of steps S302 and S303 is not executed (No in step S301), the control device 30a executes the following process, with respect to the computation units where the process of steps S302 and S303 is not executed.

That is, the control device 30a selects a type of a path between the computation unit where the process of steps S302 and S303 is not executed and the adjacent computation unit (step S302). The control device 30a determines whether the selection of the type of the path is succeeded (step S303). When the selection of the type of the path is succeeded (Yes in step S303), the control device 30a executes the process from step S301, with respect to the next computation unit having the non-processed failed node.

Meanwhile, when the selection of the type of the path fails (No in step S303), the control device 30a returns an error to the user and ends the process. That is, as illustrated in FIG. 12B or 12D, when the computation nodes having the failed nodes of the same number are adjacent to each other or exist with one computation node interposed therebetween, the control device 30a returns an error to the user and ends the process.

Figure 14:
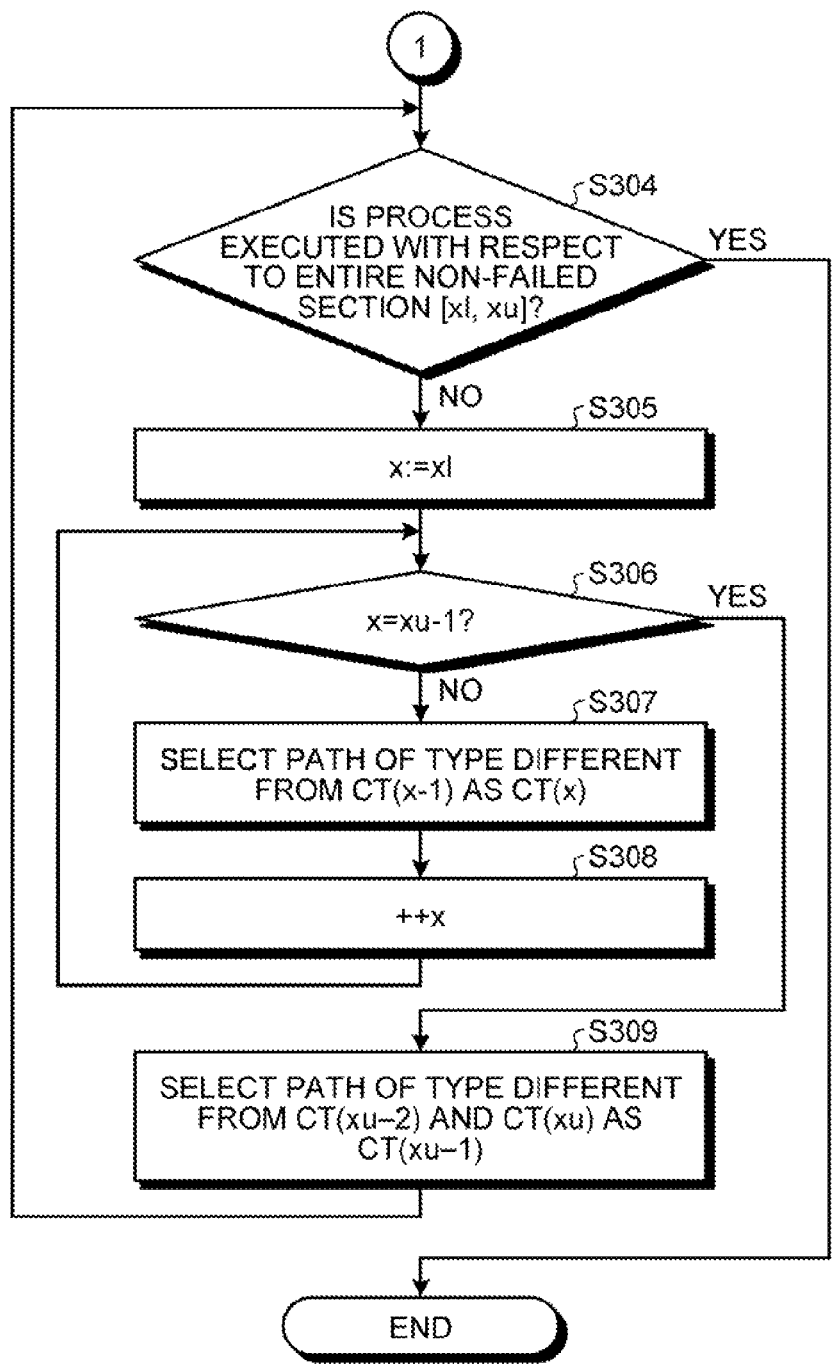
FIG. 14 is a flowchart (2) illustrating an example of a process of selecting a type of a path by the control device according to the second embodiment.
Figure 15:
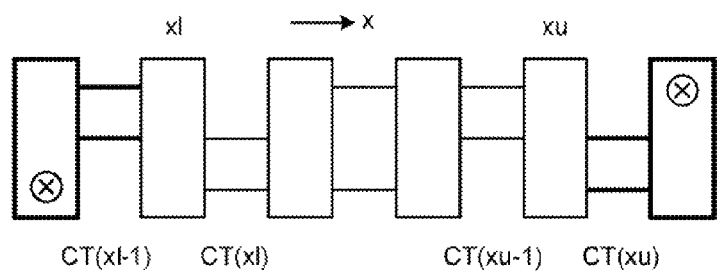
FIG. 15 is a diagram illustrating a non-failed section.

When the control device 30a executes the process of steps S302 and S303 with respect to all of the computation units having the failed nodes (Yes in step S301), the control device 30a executes the process illustrated in FIG. 14. FIG. 14 is a diagram (2) illustrating an example of a process of selecting a type of a path by the control device according to the second embodiment. FIG. 15 is a diagram illustrating a non-failed section. In the description below, as illustrated in FIG. 15, a section where the computation units that do not have failed nodes are continuous from the number "xl" to the number "xu" is set to a non-failed section "xl, xu".

Returning to FIG. 14, the control device 30a determines whether the process of steps S305 to S309 is executed with respect to the entire non-failed section "xl, xu" (step S304). When it is determined that the process of steps S305 to S309 is not executed with respect to the entire non-failed section "xl, xu" (No in step S304), the control device 30a sets a value of a parameter "x" to "xl" (step S305). Next, the control device 30a determines whether the parameter "x" satisfies "x=xu−1" (step S306).

When the parameter "x" does not satisfy "x=xu−1" (No in step S306), the control device 30a selects a path of the type different from CT(x−1) as CT(x) (step S307). At this time, the control device 30a may select a path of an arbitrary type, in the case of "x=0".

Next, the control device 30a sets a value obtained by adding "1" to the value of "x" as a new value of "x" (step S308) and determines whether "x" satisfies "x=xu−1" (step S306). Meanwhile, when the parameter "x" satisfies "x=xu−1" (Yes in step S306), the control device 30a selects a path of a type different from CT(xu−2) and CT(xu) as CT(xu−1) (step S309). Then, the control device 30a determines whether the process of steps S305 to S309 has been executed with respect to the entire non-failed section "xl, xu" (step S304). When it is determined that the process of steps S305 to S309 has been executed with respect to the entire non-failed section "xl, xu" (Yes in step S304), the control device 30a ends the process.

Effect of the Second Embodiment

As described above, the control device 30a selects the outgoing path and the returning path not connected to a failed node, from the computation unit existing at one end, among the plural computation units including the execution nodes selected by the execution node selecting unit 33. The control device 30a assigns the continuous numbers as the virtual coordinates to the plural computation nodes to be connected directly, to follow the selected outgoing path and returning path. For this reason, even when a failed node exists in the parallel computer 10, the parallel computer system 1a having the control device 30a can provide a direct interconnection network having the one-dimensional torus topology to the user. As a result, when the computation space to be calculated is divided into a one-dimensional torus shape, even though a failed node exists, the parallel computer system 1a secures that the nodes adjacent to each other with the virtual node numbers have direct paths.

[c] Third Embodiment

Figure 16:
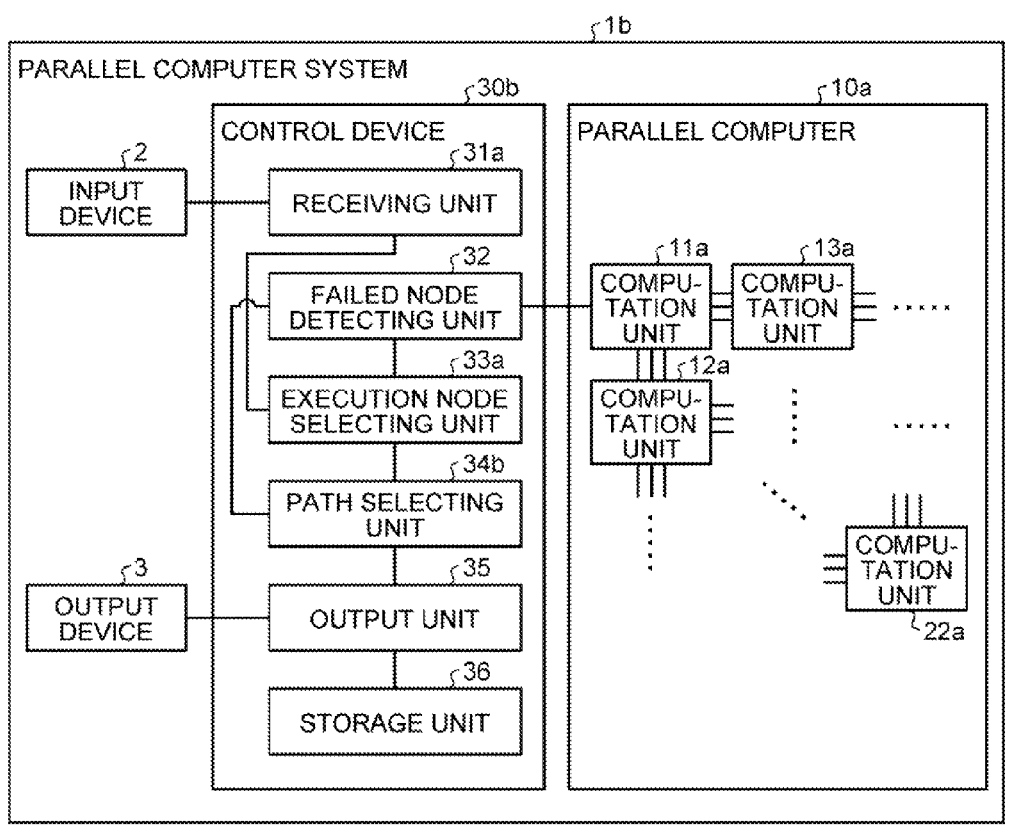
FIG. 16 is a diagram illustrating an example of a parallel computer system according to a third embodiment.

In the third embodiment, a parallel computer system 1b that provides a network of computation nodes to be connected directly in a two-dimensional mesh shape, even when a failed node exists, will be described. FIG. 16 is a diagram illustrating an example of a parallel computer system according to the third embodiment. The components executing the same processes as the processes described in the first and second embodiments among the components included in the parallel computer system 1b illustrated in FIG. 16 are denoted by the same reference numerals as those of the first and second embodiments and the description will not be repeated. In the example illustrated in FIG. 16, the parallel computer system 1b includes an input device 2, an output device 3, a control device 30b, and a parallel computer 10a.

Figure 17:
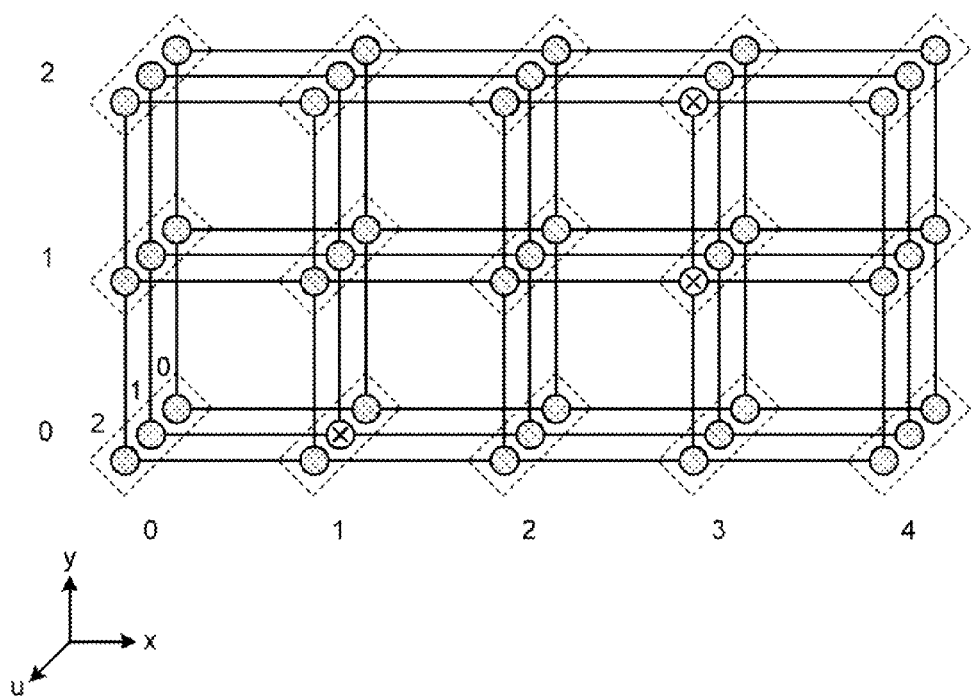
FIG. 17 is a diagram illustrating an example of computation unit groups that are included in the parallel computer according to the third embodiment.

FIG. 17 is a diagram illustrating an example of computation unit groups that are included in the parallel computer according to the third embodiment. The parallel computer 10a includes plural computation units 11a to 22a that are connected directly in a two-dimensional mesh shape, through plural links. The computation units 11a to 22a are connected by a link having three paths. Similar to the computation units 11 to 22, each of the computation units 11a to 22a has three computation nodes that are connected to each other in a torus shape.

In the example illustrated in FIG. 17, the three-dimensional physical coordinates are assigned to each computation node. Specifically, to the individual computation units, numbers of "0" to "4" in an x-axis direction and numbers of "0" to "2" in a y-axis direction in FIG. 17 are assigned. To the three computation nodes of each computation unit, "0" to "2" are assigned as numbers in a u-axis direction of FIG. 17. That is, the two-dimensional physical coordinates of "(x, y)" are assigned to the computation units 11a to 22a and the three-dimensional physical coordinates of "(x, y, u)" are assigned to each computation node.

Returning to FIG. 16, the control device 30b has a receiving unit 31a, a failed node detecting unit 32, an execution node selecting unit 33a, a path selecting unit 34b, an output unit 35, and a storage unit 36. The receiving unit 31a receives size of a two-dimensional meshed network that is input by the user using the input device 2.

Specifically, the receiving unit 31a receives the designation of the number of computation nodes in an ix-axis direction of the virtual coordinate system and the number of computation nodes in an iy-axis direction of the virtual coordinate system, as the size of the two-dimensional meshed network executing the program. Then, the receiving unit 31a notifies the execution node selecting unit 33a of the received size.

For example, the receiving unit 31a receives the size "(12, 3)" illustrating the two-dimensional meshed network having the 12 computation nodes in the ix-axis direction and 3 computation nodes in the iy-axis direction, from the user. The receiving unit 31a notifies the execution node selecting unit 33a of the received size "(12, 3)".

When the execution node selecting unit 33a receives the notification of the size of the network from the receiving unit 31a, the execution node selecting unit 33a selects the computation unit group which is the plural computation units executing the program from the parallel computer 10, on the basis of the notified size in the ix-axis direction. The execution node selecting unit 33a selects plural computation unit groups having the plural computation units that are connected to the computation units of the selected computation unit group by the link, on the basis of the notified size in the iy-axis direction.

Specifically, the execution node selecting unit 33a acquires the coordinates of the failed nodes from the failed node detecting unit 32. The execution node selecting unit 33a receives the notification of the size of the network from the receiving unit 31a. The execution node selecting unit 33a selects a failure avoidance axis and detects the coordinates excluding an axial direction component other than the failure avoidance axis, among the coordinates where the failed nodes are positioned, as the failure avoidance units.

The execution node selecting unit 33a sets the number of detected failure avoidance units as "k" and sets a size in the ix-axis direction among the sizes of the network notified from the receiving unit 31a as "N" and calculates the number of computation units included in the computation unit group from Equation 1. The execution node selecting unit 33a determines a size in the iy-axis direction among the sizes of the network notified from the receiving unit 31a as the number of computation unit groups executing the program. Then, the execution node selecting unit 33a selects the computation unit groups of the determined number from the parallel computer 10a and notifies the path selecting unit 34b of the selected computation unit groups, the detected failure avoidance units, and the failure avoidance axis.

For example, the execution node selecting unit 33a receives the notification of the size "(12, 3)" of the network from the receiving unit 31a. The execution node selecting unit 33a receives the notification of the physical coordinates "(x, y, u)=(1, 0, 1), (3, 1, 2), (3, 2, 2)" of the failed nodes from the failed node detecting unit 32. The execution node selecting unit 33a sets the failure avoidance axis as the x-axis direction.

In this case, the execution node selecting unit 33a detects "(1, 1), (3, 2)" as the failure avoidance units. The execution node selecting unit 33a solves Equation 1 by "k=2", "N=12", and "m=3" and calculates the number "5" of computation units included in one computation unit group. Since the notified size of the network is "(12, 3)", the execution node selecting unit 33a determines that the number of computation unit groups executing the program is "3".

For this reason, the execution node selecting unit 33a selects a two-dimensional network where the 5 computation units are connected in the x-axis direction and the 3 computation units are connected in the y-axis direction, from the parallel computer 10a, and notifies the path selecting unit 34b of the selected computation unit groups. The execution node selecting unit 33a notifies the path selecting unit 34b that the failure avoidance axis is in the x axis direction and the failure avoidance units are "(1, 1), (3, 2)".

The path selecting unit 34b selects paths other than the path connected to the failed node from each link which connect the two adjacent computation units, with respect to each of the plural computation unit groups notified from the execution node selecting unit 33a.

Specifically, the path selecting unit 34b receives the notification of the plural computation unit groups selected by the execution node selecting unit 33a, the failure avoidance units, and the failure avoidance axis. In this case, the path selecting unit 34b regards all of the computation nodes including the coordinates of the failure avoidance units as the failed nodes. The path selecting unit 34b selects a path to connect the plural computation nodes other than the failed nodes serially and directly, using the same method as the method used in the first embodiment, with respect to one computation unit group among the notified plural computation unit groups.

The path selecting unit 34b assigns the continuous virtual coordinates to each computation node to follow the path. Then, the path selecting unit 34b assigns the virtual coordinates in the same way, with respect to the other computation unit groups. That is, when the path selecting unit 34b selects the path with respect to one computation unit group, the path selecting unit 34b applies the same path to the other computation unit groups and assigns the continuous virtual coordinates to each computation node to follow the applied path. The path selecting unit 34b notifies the output unit 35 of the virtual coordinates assigned to each computation node as the virtual coordinates of the dimension different for each computation unit group.

In other words, the path selecting unit 34b multiplexes (projects) all of the computation unit groups notified from the execution node selecting unit 33a in a planar direction (for example, the xu planar direction) including the failure avoidance axis. The path selecting unit 34b selects a path to avoid the computation node at the position of the multiplexed failed node to perform one-stroke drawing, with respect to the computation unit group obtained by multiplexing the computation unit groups. By applying the selected path to all of the computation unit groups, the path selecting unit 34b can easily provide a network constituting the direct interconnection network having the two-dimensional mesh shape to the user.

Hereinafter, a specific example of a process that is executed by the control device 30b will be described using FIGS. 18A to 18D. In the description below, the control device 30b receives the sizes "(12, 3)" of the two-dimensional meshed network from the user and selects the network where the "5" computation units are connected in the x-axis direction and the "3" computation units are connected in the y-axis direction, as illustrated in FIG. 17. The control device 30b selects the x-axis direction as the failure avoidance axis.

In this case, the control device 30b regards each of the computation units having the numbers "(0, 0)" to "(0, 4)" and the computation units having the numbers "(1, 0)" to "(1, 4)" as one computation unit group. The control device 30b regards the computation units having the numbers "(2, 0)" to "(2, 4)" as one computation unit group. The control device 30b detects the failure avoidance units "(1, 1), (3, 2)" from the coordinates "(x, y, u)=(1, 0, 1), (3, 1, 2), (3, 2, 2)" of the failed nodes.

Figure 18A:
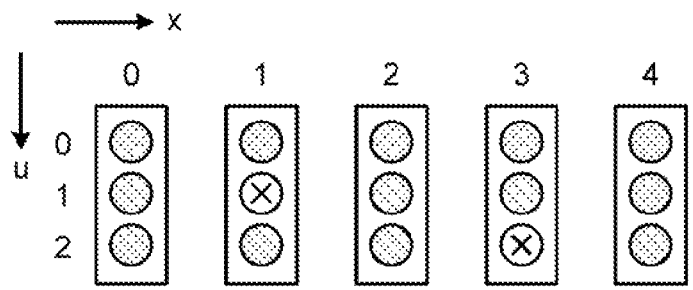
FIG. 18A is a diagram (1) illustrating a flow of a process that is executed by a control device according to the third embodiment.

FIG. 18A is a diagram (1) illustrating the flow of a process that is executed by the control device according to the third embodiment. FIG. 18A is a diagram illustrating an example of the case where each computation unit group selected by the control device 30b is projected as one computation unit group. In the example illustrated in FIG. 18A, since the failure avoidance units are "(1, 1), (3, 2)", the control device 30b regards the computation node having the number "1" included in the computation unit having the number "1" and the computation unit having the number "2" included in the computation unit having the number "3" as the failed nodes.

Figure 18B:
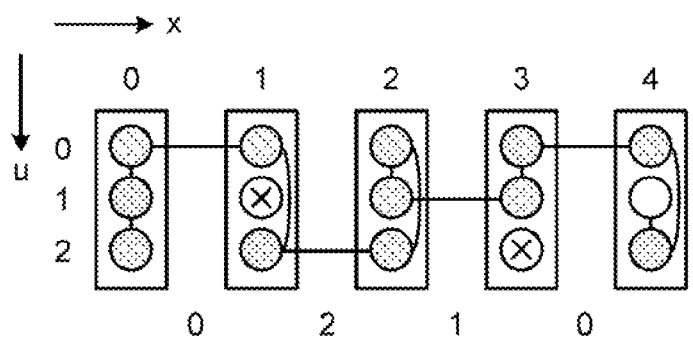
FIG. 18B is a diagram (2) illustrating a flow of a process that is executed by the control device according to the third embodiment.

FIG. 18B is a diagram (2) illustrating the flow of a process that is executed by the control device according to the third embodiment. As illustrated in FIG. 18B, the control device 30b selects a path between the computation units, with respect to one computation unit group where each computation unit group is projected, similar to the control device 30 according to the first embodiment. Specifically, the control device 30b selects the types of the paths having the types "0", "2", "1", and "0" not connected to the failed nodes, sequentially from the computation unit having the number "0" in the x-axis direction.

Figure 18C:
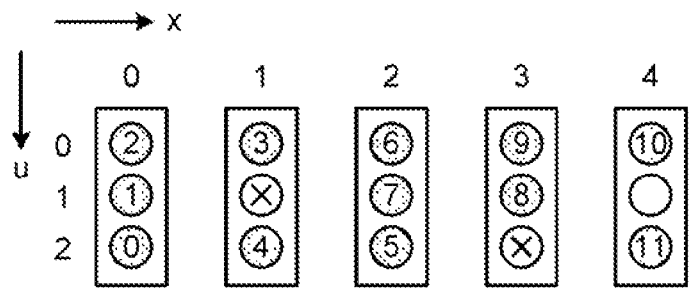
FIG. 18C is a diagram (3) illustrating a flow of a process that is executed by the control device according to the third embodiment.

FIG. 18C is a diagram (3) illustrating the flow of a process that is executed by the control device according to the third embodiment. As illustrated in FIG. 18C, the control device 30b assigns the numbers "0" to "11" as the virtual coordinates in the ix-axis direction to the computation nodes to follow the selected path, with respect to one computation unit group where each computation unit group is projected. The control device 30b assigns the assigned virtual coordinates in the ix-axis direction to the computation units of all of the computation unit groups, according to the position relation. The control device 30b sets the y-axis coordinates of the computation nodes included in each computation unit group as the virtual coordinates of the iy axis.

Figure 18D:
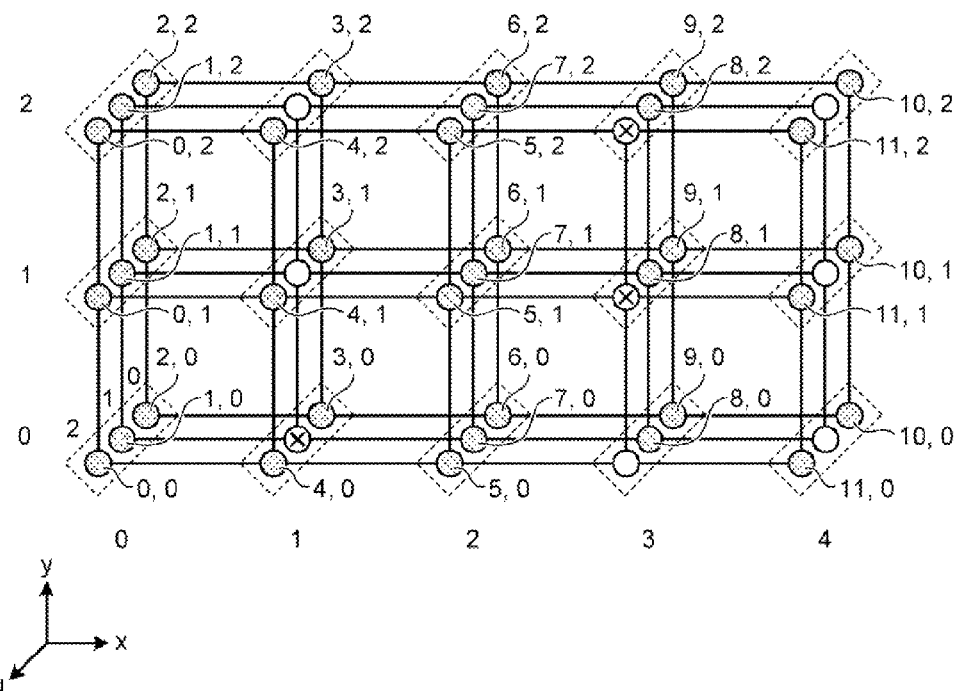
FIG. 18D is a diagram (4) illustrating a flow of a process that is executed by the control device according to the third embodiment.

FIG. 18D is a diagram (4) illustrating the flow of a process that is executed by the control device according to the third embodiment. As illustrated in FIG. 18D, the control device 30b assigns the virtual coordinates of "(ix, iy)=(0, 0)" to "(ix, iy)=(11, 0)" to the computation unit group where the y-axis coordinates are "0". The control device 30b assigns the virtual coordinates of "(ix, iy)=(0, 1)" to "(ix, iy)=(11, 1)" to the computation unit group where the y-axis coordinates are "1". The control device 30b assigns the virtual coordinates of "(ix, iy)=(0, 2)" to "(ix, iy)=(11, 2)" to the computation unit group where the y-axis coordinates are "2".

In this case, the control device 30b assigns the continuous numbers as the virtual coordinates to the adjacent computation nodes. For this reason, the adjacent computation nodes on the virtual coordinates becomes the adjacent computation nodes that are directly connected by the link even on the physical coordinates, so that the association between the Manhattan distance on the virtual coordinates and the Manhattan distance on the physical coordinates is ensured at the time of communication between the computation nodes. That is, even when the failed nodes are included in the parallel computer 10a, the control device 30b can provide the virtual coordinates to the user in order to directly connect the computation nodes in the two-dimensional mesh shape.

Effects of Third Embodiment

As described above, the control device 30b selects a path other than the paths connected to the failed nodes to perform one-stroke drawing, from the computation unit disposed at one end to any computation node included in the computation unit disposed at the other end, with respect to each of the selected plural computation unit groups. For this reason, even when a failed node exists, the parallel computer system 1b having the control device 30b can provide a network which has the computation nodes directly connected thereto in the two-dimensional mesh shape, to the user.

The control device 30b multiplexes the selected plural computation unit groups as one computation unit group. The control device 30b selects a path to directly connect the computation nodes other than the computation node positioned at the coordinates of the multiplexed failed node in series, with respect to the multiplexed computation unit group. Then, the control device 30b applies the selected path to all of the selected computation unit groups and assigns the continuous virtual coordinates to the computation nodes of each computation unit group to follow the applied path.

For this reason, the control device 30b assigns the continuous virtual coordinates to all of the computation unit groups to follow the same path and can ensure that the nodes adjacent to each other having the continuous virtual node numbers have direct paths. That is, each computation node is directly connected to the computation nodes existing in axial directions other than the failure avoidance axis by the link. For this reason, the control device 30b assigns the continuous virtual coordinates to all of the computation unit groups to follow the same path. When the virtual coordinates in the different axial direction are assigned for each computation unit group, the control device 30b can provide the virtual coordinates to directly connect the computation nodes in the two-dimensional mesh shape. As a result, when the computation space is divided into a two-dimensional mesh shape, even though the failed nodes exist, the parallel computer system 1b can map each area to the computation node which has the appropriate position relation.

[d] Fourth Embodiment

Figure 19:
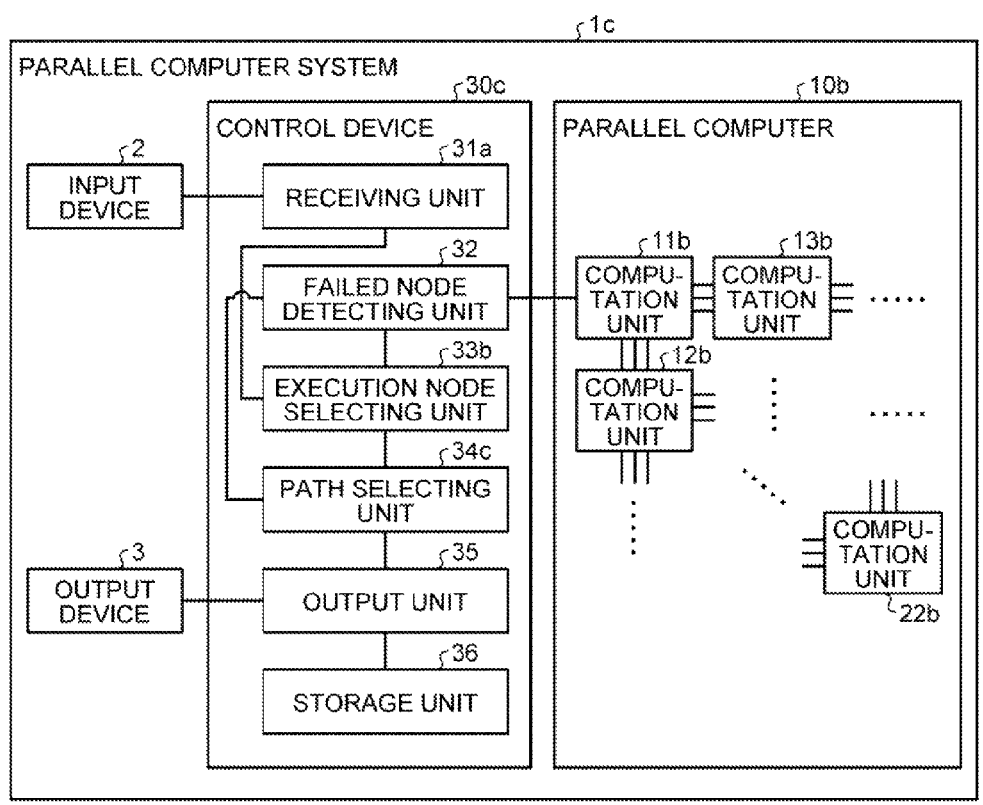
FIG. 19 is a diagram illustrating an example of a parallel computer system according to a fourth embodiment.

In the fourth embodiment, a parallel computer system 1c that provides a network of computation nodes directly connected in a two-dimensional torus shape, even when a failed node exists, will be described. FIG. 19 is a diagram illustrating an example of a parallel computer system according to the fourth embodiment. The components executing the same processes as the processes illustrated in the first to third embodiments among the components included in the parallel computer system 1c illustrated in FIG. 19 are denoted by the same reference numerals as those of the first to third embodiments and the description will not be repeated.

Figure 20:
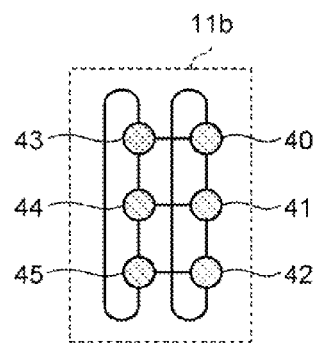
FIG. 20 is a diagram illustrating an example of a computation unit according to the fourth embodiment.

A parallel computer 10b includes plural computation units 11b to 22b that are directly connected in a two-dimensional mesh shape in the x-axis direction and the y-axis direction. FIG. 20 is a diagram illustrating an example of a computation unit according to the fourth embodiment. As illustrated in FIG. 20, a computation unit 11b has 6 computation nodes 40 to 45 that are connected in a torus shape. Each of the computation nodes 40 to 45 has the same configuration as that of the computation node 40 according to the first embodiment and the description will not be repeated.

Figure 21:
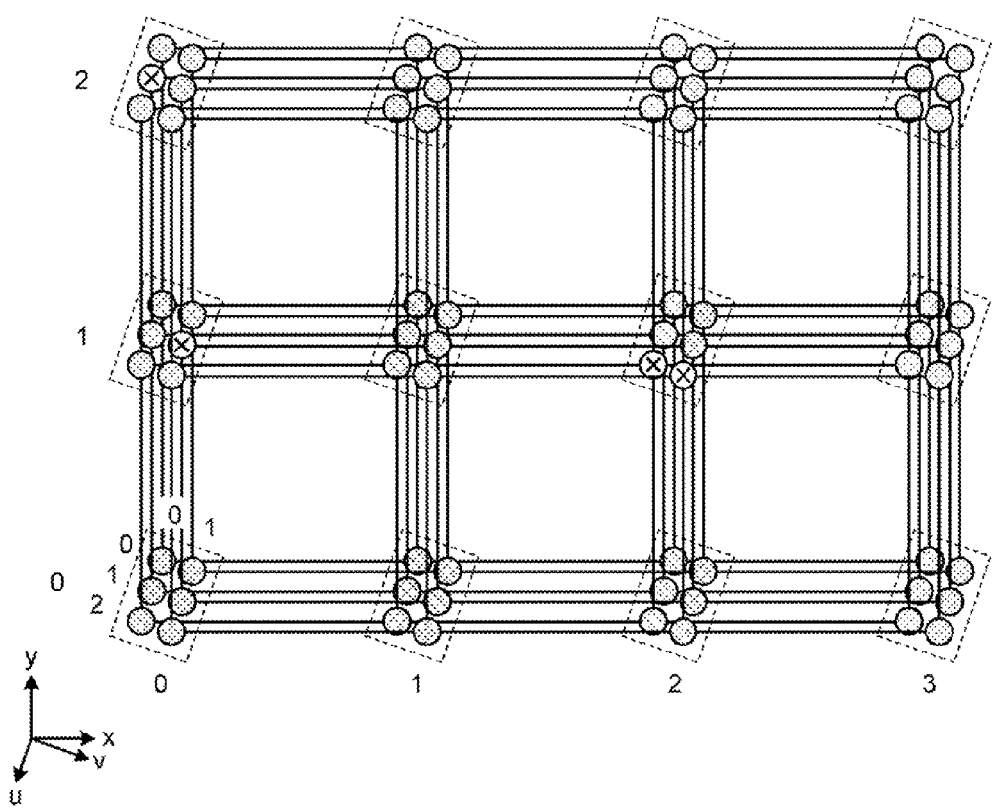
FIG. 21 is a diagram illustrating topology for coupling computation units according to the fourth embodiment.

FIG. 21 is a diagram illustrating topology for connecting the computation units according to the fourth embodiment. As illustrated in FIG. 21, the parallel computer 10b has the plural computation units 11b to 22b that are connected in a mesh shape where the 4 computation units are disposed in the x-axis direction and the 3 computation units are disposed in the y-axis direction, through the plural links. To the computation units 11b to 22b, the two-dimensional physical coordinates having the numbers "0" to "3" in the x-axis direction and the numbers "0" to "2" in the y-axis direction are assigned.

The 6 computation nodes that are included in each of the computation units 11b to 22b can be divided into two blocks where the 3 computation nodes are connected in a ring shape. In this case, the physical coordinates of "0" and "1" are assigned in the v-axis direction to each ring and the coordinates of "0" to "3" are assigned in the u-axis direction to the 3 computation nodes of each ring.

Returning to FIG. 19, a control device 30c has an execution node selecting unit 33b and a path selecting unit 34c. The execution node selecting unit 33b sets the two axes of the x axis and the u axis as the failure avoidance axes and detects numbers where the numbers in the y-axis direction and the numbers in the v-axis direction are deleted among the coordinates assigned to the failed node as the failure avoidance units. The execution node selecting unit 33b notifies the path selecting unit 34c of the detected failure avoidance units.

The path selecting unit 34c executes the following process with respect to each of the plural computation unit groups including the plural computation units connected in the x-axis direction. That is, the path selecting unit 34c selects the two paths, the outgoing path and the returning path, from the paths other than the path connected to the failed node, such that the paths are repeated from the computation unit disposed at one end to the computation unit disposed at the other end.

Specifically, the path selecting unit 34c regards the plural blocks where the numbers in the v-axis direction are the same among the plural blocks connected in the x-axis direction as one block group. That is, when the failure avoidance axes are the x axis and the u axis, the path selecting unit 34c multiplexes each block group on a xu plane. The path selecting unit 34c selects a path other than the paths connected to the notified failure avoidance units to perform one-stroke drawing, from the block disposed at one end to the computation nodes included in the block disposed at the other end, with respect to the multiplexed block group.

The path selecting unit 34c applies the selected path to each block group and assigns the continuous numbers as the virtual coordinates in the x-axis direction to the computation nodes of each block group to follow the selected path. The path selecting unit 34c selects the path to connect each block group in a ring shape, on the basis of the y-axis direction coordinates and the v-axis direction coordinates of the computation nodes of each block group. The path selecting unit 34c assigns the continuous numbers as the virtual coordinates in the y-axis direction to the computation units of each block group to follow the selected path.

Hereinafter, an example of a process of selecting a path by the control device 30c having the path selecting unit 34c will be described using FIGS. 22A to 22F. In the description below, the control device 30c gets a request to provide the network where the sizes are "(ix, iy)=(10, 6)" and the computation nodes are directly connected in a torus shape by the user.

For example, the control device 30c regards the 12 computation nodes having the number "0" in the v-axis direction among the 24 computation nodes having the number "0" in the y-axis direction, in the computation nodes illustrated in FIG. 21, as one block group. The control device 30c regards the 12 computation nodes having the number "1" in the v-axis direction among the 24 computation nodes having the number "0" in the y-axis direction, as one block group.

As illustrated in FIG. 21, the control device 30c detects that the 4 computation nodes having the physical coordinates "(0, 1, 1, 1)", "(0, 2, 1, 0)", "(2, 1, 2, 0)", and "(2, 1, 2, 1)" are the failed nodes. For this reason, the control device 30c deletes the numbers in the y-axis direction and the numbers in the v-axis direction of the coordinates of the failed nodes and detects "(0, 1) and (2, 2)" as the failure avoidance units.

Figure 22A:
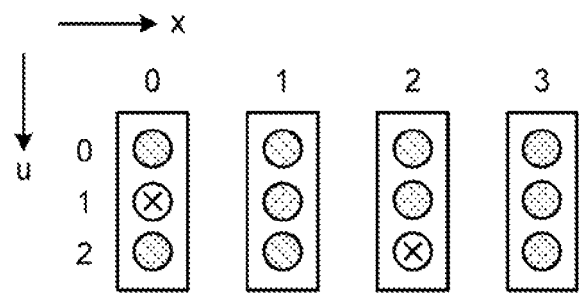
FIG. 22A is a diagram (1) illustrating an example of a process of selecting a path by a control device according to the fourth embodiment.

FIG. 22A is a diagram (1) illustrating an example of a process of selecting a path by the control device according to the fourth embodiment. In FIG. 22A, each of the block groups is multiplexed as one block group on the xu plane including the x axis and the u axis which are the failure avoidance axes. In FIG. 22A, the control device 30c regards "(0, 1) and (2, 2)", which are the failure avoidance units, as the failed nodes.

Figure 22B:
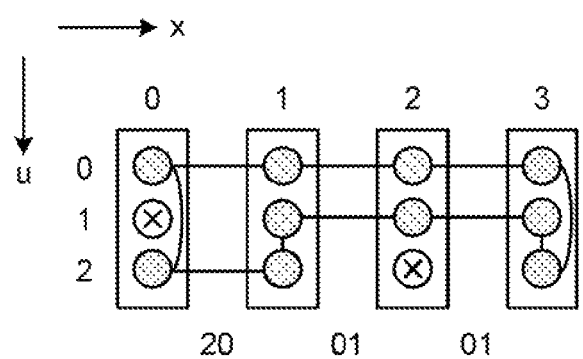
FIG. 22B is a diagram (2) illustrating an example of a process of selecting a path by the control device according to the fourth embodiment.

FIG. 22B is a diagram (2) illustrating an example of a process of selecting a path by the control device according to the fourth embodiment. As illustrated in FIG. 22B, the control device 30c executes the same process as that of the control device 30a and selects the two paths, the outgoing path and the returning path, not connected to the failed nodes such that the paths are repeated from the block positioned at one end to the block positioned at the other end. Specifically, the control device 30c selects the types "20", "01", and "01" of the paths not connected to the failed nodes between the computation units sequentially from the computation unit where the number in the x-axis direction is "0".

Figure 22C:
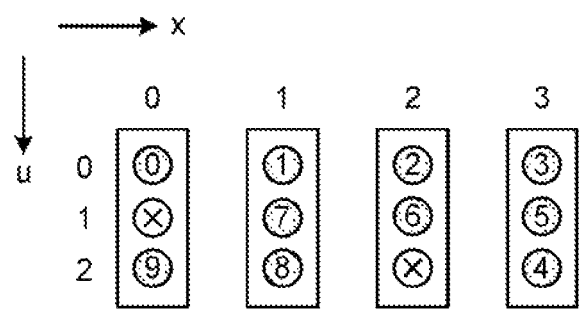
FIG. 22C is a diagram (3) illustrating an example of a process of selecting a path by the control device according to the fourth embodiment.

FIG. 22C is a diagram (3) illustrating an example of a process of selecting a path by the control device according to the fourth embodiment. As illustrated in FIG. 22C, when the path is selected, the control device 30c assigns the continuous numbers "0" to "9" as the virtual coordinates in the ix-axis direction to the computation nodes of each block group to follow the selected path. The control device 30c assigns the assigned virtual coordinates in the ix-axis direction to the computation units of all of the block groups according to the position relation.

Figure 22D:
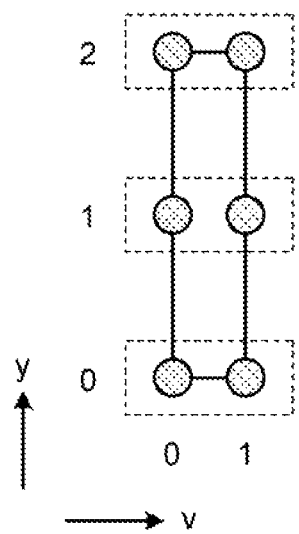
FIG. 22D is a diagram (4) illustrating an example of a process of selecting a path by the control device according to the fourth embodiment.

FIG. 22D is a diagram (4) illustrating an example of a process of selecting a path by the control device according to the fourth embodiment. In the example illustrated in FIG. 22D, all of the blocks of the parallel computer 10b are projected onto a plane including the y-axis direction and the v-axis direction. As illustrated in FIG. 22D, the control device 30c multiplexes all of the blocks on a yu plane including the y-axis direction and the u-axis direction which are not the failure avoidance axes.

Figure 22E:
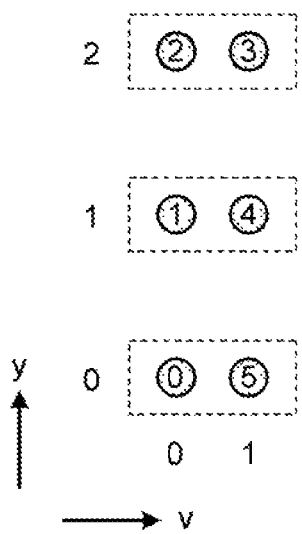
FIG. 22E is a diagram (5) illustrating an example of a process of selecting a path by the control device according to the fourth embodiment.

FIG. 22E is a diagram (5) illustrating an example of a process of selecting a path by the control device according to the fourth embodiment. In the example illustrated in FIG. 22E, the control device 30c assigns the continuous virtual coordinates "0" to "5" as the virtual coordinates in the iy-axis direction, such that continuous virtual coordinates are assigned to the computation nodes directly connected by the link, on the yv plane.

Figure 22F:
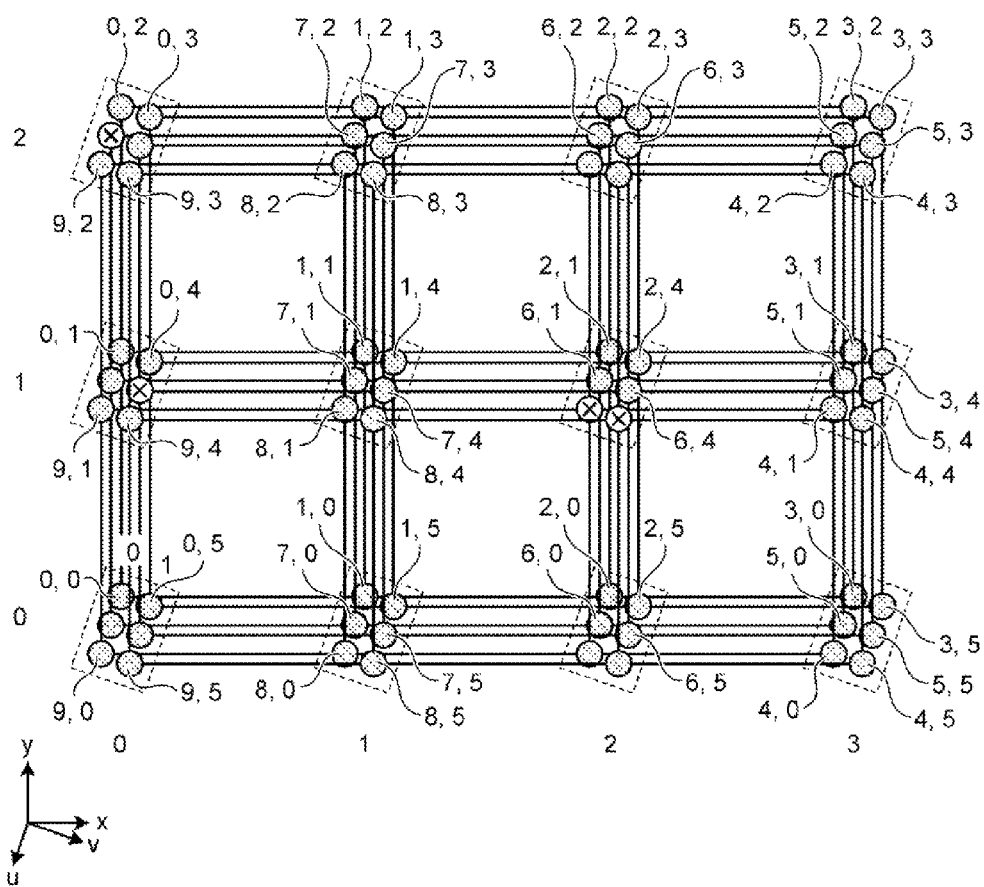
FIG. 22F is a diagram (6) illustrating an example of a process of selecting a path by the control device according to the fourth embodiment.

FIG. 22F is a diagram (6) illustrating an example of a process of selecting a path by the control device according to the fourth embodiment. As illustrated in FIG. 22F, by executing the above-described process, the control device 30c can assign the virtual coordinates to operate the network as a network having arbitrary sizes to directly connect the computation nodes in the two-dimensional torus shape, even when failed nodes exist.

In this case, the path selecting unit 34c can provide the network having arbitrary sizes where the computation nodes are directly connected in the two-dimensional torus shape, even when the number of computation nodes included in each of the computation units 11b to 22b is different. Therefore, in the description below, the case where the parallel computer system 1c has a parallel computer 10c and the parallel computer 10c has computation units 11c to 22c having 9 computation nodes to be directly connected in the torus shape will be described.

Figure 23:
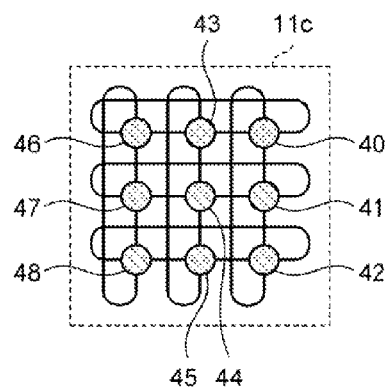
FIG. 23 is a diagram illustrating computation units which have 9 computation nodes.

FIG. 23 is a diagram illustrating the computation unit having the 9 computation nodes. As illustrated in FIG. 23, the computation unit 11c has 9 computation nodes 40 to 48 that are connected in a torus shape. Since each of the computation nodes 40 to 48 has the same configuration as that of the computation node 40, the description will not be repeated. Since each of a computation units 12c to 22c has the same configuration as that of the computation unit 11c, the description will not be repeated.

Figure 24:
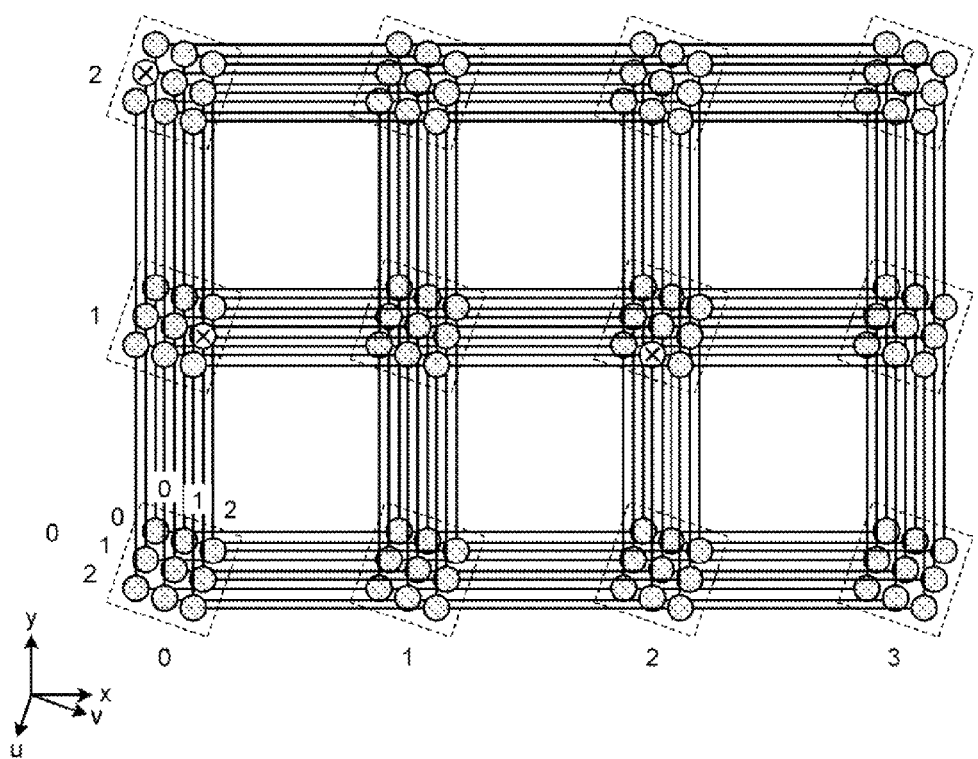
FIG. 24 is a diagram illustrating an example of a case where computation units which have 9 computation nodes are connected in a two-dimensional mesh shape.

FIG. 24 is a diagram illustrating an example of the case where the computation units having the 9 computation nodes are connected in a two-dimensional mesh shape. Similar to the above-described embodiments, to the computation units 11c to 22c, the two-dimensional coordinates of "0" to "3" in the x-axis direction and "0" to "2" in the y-axis direction in FIG. 24 are assigned. To the plural computation nodes of each computation unit, the coordinates of "0" to "2" in the u-axis direction and the coordinates of "0" to "2" in the v-axis direction are assigned. That is, each of the computation units 11c to 22c is a computation unit that is obtained by expanding the computation nodes in the v-axis direction, with respect to each of the computation units 11b to 22b. In other words, each of the computation units 11c to 22c is a computation unit that is obtained by adding one block with respect to each of the computation units 11b to 22b.

For example, the control device 30c gets a request to provide the two-dimensional torus network where the size is "(x, y)=(10, 7)" by the user. In the example illustrated in FIG. 24, the control device 30c detects the coordinates "(0, 1, 1, 2)", "(0, 2, 1, 0)", and "(2, 1, 2, 1)" of the failed nodes. In this case, the control device 30c detects "(0, 1)" and "(2, 2)" which are the failure avoidance units.

The control device 30c solves Equation 1 by "N=10", "m=3", and "k=2" and "n=4" is calculated. The control device 30c solves the following Equation 2 by "N=6" and "m=2" and "n=3" is calculated. The control device 30c selects a range where the "4" computation units in the x-axis direction and the "3" computation units in the y-axis direction from the computation unit of "(x, y)=(0, 0)" are connected in the two-dimensional mesh shape.

$$n = \text{ceiling}(N/m) \quad (2)$$

The control device 30c regards the computation units as one block, where the coordinates in the v-axis direction are the same computation unit among the plural computation units of the computation units 11c to 22c. That is, the control device 30c divides each of the computation units 11c to 22c into three blocks. The control device 30c regards the four blocks as one block group, where the numbers of the v-axis direction are the same computation unit among the plural bocks of each computation unit group. That is, in the example illustrated in FIG. 24, the control device 30c regards the three computation units as the 9 block groups.

Figure 25A:
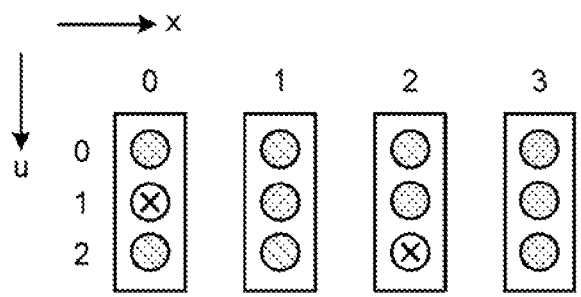
FIG. 25A is a diagram (1) illustrating an example of a process of selecting a path by the control device according to the fourth embodiment, when the computation units have 9 computation nodes.

Next, a process of assigning the virtual coordinates to the computation nodes of the computation units 11c to 22c by the control device 30c will be described using FIGS. 25A to 25F. In the description below, the control device 30c selects the x axis as the failure avoidance axis. FIG. 25A is a diagram (1) illustrating an example of a process of selecting a path by the control device according to the fourth embodiment, when each computation unit has the 9 computation nodes. As illustrated in FIG. 25A, the control device 30c multiplexes the 9 block groups as one block group. In FIG. 25A, the control device 30c regards "(x, u)=(0, 1), (2, 2)", which are the failure avoidance units, as the failed nodes.

Figure 25B:
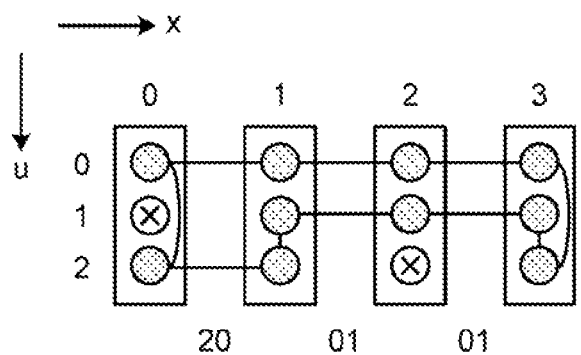
FIG. 25B is a diagram (2) illustrating an example of a process of selecting a path by the control device according to the fourth embodiment, when the computation units have 9 computation nodes.

FIG. 25B is a diagram (2) illustrating an example of a process of selecting a path by the control device according to the fourth embodiment, when each computation unit has the 9 computation nodes. As illustrated in FIG. 25B, the control device 30c selects the type of a path between the blocks to avoid the failed nodes. In an example illustrated in FIG. 25B, the control device 30c selects the type "20" of a path between a block where the coordinates in the x-axis direction are "0" and a block where the coordinates in the x-axis direction are "1" and selects the type "01" of a path between a block where the coordinates in the x-axis direction are "1" and a block where the coordinates in the x-axis direction are "2". The control device 30c selects the type "01" of a path between a block where the coordinates in the x-axis direction are "2" and a block where the coordinates in the x-axis direction are "3". Then, the control device 30c selects a path to connect the computation nodes in each block.

Figure 25C:
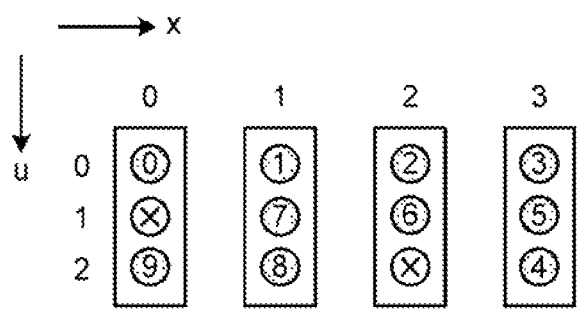
FIG. 25C is a diagram (3) illustrating an example of a process of selecting a path by the control device according to the fourth embodiment, when the computation units have 9 computation nodes.

FIG. 25C is a diagram (3) illustrating an example of a process of selecting a path by the control device according to the fourth embodiment, when each computation unit has the 9 computation nodes. As illustrated in FIG. 25C, when the control device 30c selects the type of a path between the blocks and the path in each block, the control device 30c assigns the continuous numbers as the virtual coordinates in the ix-axis direction to the computation nodes to follow the selected path.

Figure 25D:
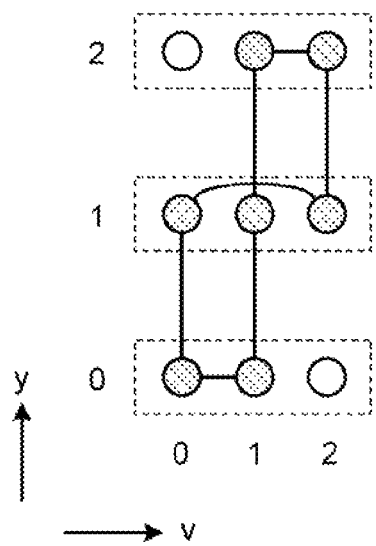
FIG. 25D is a diagram (4) illustrating an example of a process of selecting a path by the control device according to the fourth embodiment, when the computation units have 9 computation nodes.

Next, the control device 30c determines a path in the y-axis direction with respect to each block group. FIG. 25D is a diagram (4) illustrating an example of a process of selecting a path by the control device according to the fourth embodiment, when each computation unit has the 9 computation nodes. As illustrated in FIG. 25D, the control device 30c multiplexes the computation nodes of each block group on the yv plane. The control device 30c selects the plural paths to directly connect the seven computation nodes multiplexed on the yv plane in a ring shape, when the user requests the size of the y-axis direction among the sizes of the network is "7".

Figure 25E:
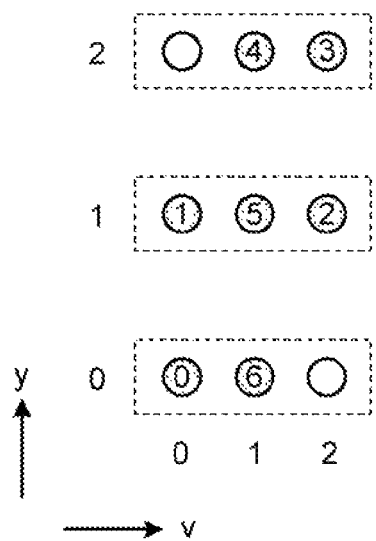
FIG. 25E is a diagram (5) illustrating an example of a process of selecting a path by the control device according to the fourth embodiment, when the computation units have 9 computation nodes.

FIG. 25E is a diagram (5) illustrating an example of a process of selecting a path by the control device according to the fourth embodiment, when each computation unit has the 9 computation nodes. As illustrated in FIG. 25E, when the control device 30c selects the plural paths to directly connect the 7 computation nodes in a ring shape, the control device 30c assigns the continuous numbers "0" to "6" as the virtual coordinates in the y-axis direction to the computation nodes to follow the selected paths.

Figure 25F:
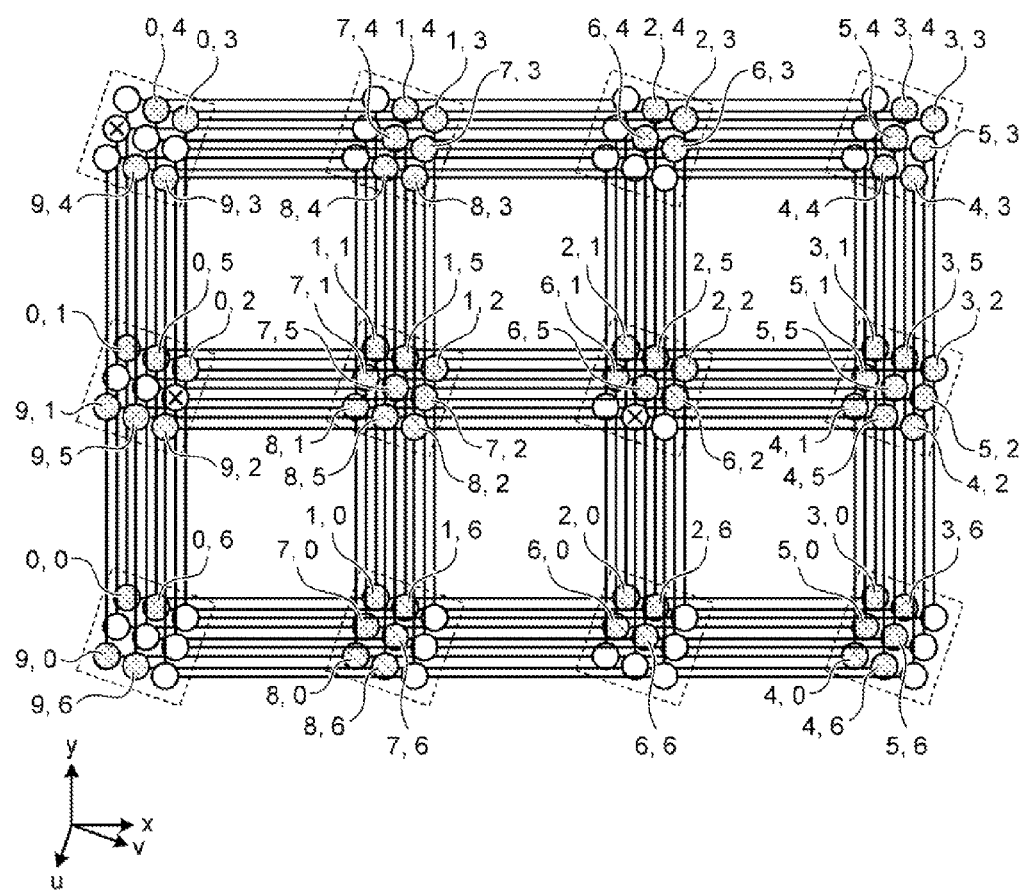
FIG. 25F is a diagram (6) illustrating an example of a process of selecting a path by the control device according to the fourth embodiment, when the computation units have 9 computation nodes.

FIG. 25F is a diagram (6) illustrating an example of a process of selecting a path by the control device according to the fourth embodiment, when each computation unit has the 9 computation nodes. As illustrated in FIG. 25F, by executing the above-described process, the control device 30c can assign the virtual coordinates to operate the network as a network having arbitrary sizes to directly connect the computation nodes in the two-dimensional torus shape, even when the failed nodes exist.

Flow of Process of Control Device 30c

Next, the flow of a process that is executed by the control device 30c will be described using FIG. 26. FIG. 26 is a flowchart illustrating an example of the flow of a process that is executed by the control device according to the fourth embodiment. In the flowchart illustrated in FIG. 26, the process that is executed by the control device 30c is generalized.

In the example illustrated in FIG. 26, the connection topology of the computation units is set to "M" dimensions and the physical coordinates of each computation node are represented by "($x^1$ to $x^M$, $u^1$ to $u^M$)". The virtual coordinates that are assigned to each computation node are represented by "$X^1$ to $X^M$" and the physical coordinates that correspond to the virtual coordinates "$X^j$" are represented by "($x^{j'}$ to $u^{j''}$)". The failure avoidance axis is represented by the virtual coordinates "$X^{\eta}$", that is, the physical coordinates "($x^{\eta'}$, $u^{\eta''}$)".

In this case, "$0 \leq X^{\eta} < N$", "$0 \leq X^{\eta'} < n$", and "$0 \leq u^{\eta''} < m$" are satisfied. The list "F" of failed nodes is represented by "($x^1_1$ to $x^M_1$, $u^1_1$ to $u^M_1$)" to "($x^1_K$ to $x^M_K$, $u^1_K$ to $u^M_K$)". The number of failed nodes becomes "K".

In the description below, in the case of "m≥2", the flowchart to be described below corresponds to the process executed by the control device 30b described in the third embodiment. In the case of "m≥3", the flowchart to be described below corresponds to the process executed by the control device 30c described in the fourth embodiment.

First, the control device 30c associates "$X^j$" and "($x^{j'}$, $u^{j''}$)", selects association between the axes of the virtual coordinates and the physical coordinates, and selects the failure avoidance axis "($x^{\eta'}$, $u^{\eta''}$)" (step S401).

Next, the control device 30c sets the parameter "k" indicating the number of failure units to "0", sets the parameter "F" indicating a set of failure avoidance units to an empty list "φ", and sets the parameter "j" to identify the failed node to "1" (step S402). Next, the control device 30c acquires "$x^{\eta'}_j$" and "$u^{\eta''}_j$" from the coordinates of the "j"-th failed node (step S403).

Next, the control device 30c determines whether "($x^{\eta'}_j$, $u^{\eta''}_j$)" is included in the list "F" of failed nodes (step S404). When "($x^{\eta'}_j$, $u^{\eta''}_j$)" is included in the list "F" of failed nodes (Yes in step S404), the control device 30c adds "1" to the parameter "K" and adds "($x^{\eta'}_j$, $u^{\eta''}_j$)" to the list "F" of failed nodes (step S405). Meanwhile, when "($x^{\eta'}_j$, $u^{\eta''}_j$)" is not included in the list "F" of failed nodes (No in step S404), the control device 30c skips the process of step S405.

Next, the control device 30c determines whether a value obtained by adding "1" to the parameter "j" is the number "K" of failed nodes or less (step S406). The control device 30c adds "1" to the parameter "j" and sets a new value of "j". When it is determined that the new value of "j" is the number "K" of failed nodes or less (Yes in step S406), the control device 30c executes step S403 again. Meanwhile, when it is determined that the new value of "j" is more than the number "K" of failed nodes, that is, the process with respect to all of the failed nodes ends (No in step S406), the control device 30c selects the computation units to be used (step S407). Specifically, the control device 30c selects the continuous computation units of the number calculated from "ceiling ((N+k)/m)" with respect to a direction of "$x^{\eta'}$" and selects the computation units of the number calculated from "ceiling ($N_j/m_j$)" with respect to the other axial directions.

Next, the control device 30c selects types "CT(0) to CT(n−2)" of paths between the computation units, with respect to the plural computation units connected in the direction of "$x^{\eta'}$", that is, the computation unit group (step S408). Since the process of selecting the type of the path is the same as the process illustrated in FIGS. 13 and 14, the detailed description will not be repeated.

Next, the control device 30c selects a path in a "$u^{\eta''}$"-axis direction in the unit with respect to the computation units from "$x^{\eta'}=1$" to "$x^{\eta'}=(n-2)$" (step S409). That is, the control device 30c selects a path that passes each computation node in each computation unit only once (step S410). Next, the control device 30c determines the association between the physical coordinates "($x^{\eta'}_j$, $u^{\eta''}_j$)" and the virtual coordinates "$X^{\eta}$" (step S411). That is, the control device 30c assigns the continuous numbers to the computation nodes as the virtual coordinates of one axial direction to follow the selected path.

Next, the control device 30c executes the following process with respect to the parameter "j" other than "j=η" satisfying "1≤j≤M" (step S412). That is, the control device 30c determines the association between the physical coordinates "($x^{j'}$, $u^{j''}$)" and the virtual coordinates "$X^j$" (step S413). That is, the control device 30c selects the path between the multiplexed computation units with respect to the axial directions other than the axial direction where the path is selected in steps S408 to S411 and assigns the continuous numbers as the virtual coordinates to the computation nodes of the computation units to follow the selected path. Then, when the control device 30c executes the process of step S412 with respect to the parameter "j" other than "j=η" satisfying "1≤j≤M" (completion of step S412), the control device 30c ends the process.

Effects of Fourth Embodiment

As described above, the control device 30c executes the following process with respect to each of the plural computation unit groups including the plural computation units connected in one axial direction, with respect to the plural computation units connected in the two-dimensional mesh shape. That is, the control device 30c selects the two paths of the outgoing path and the returning path from the paths not connected to the failed nodes between the computation units such that the paths are repeated from the computation unit positioned at one end to the computation unit positioned at the other end.

The control device 30c divides the plural computation nodes of one computation unit into the plural blocks including the plural computation nodes directly connected in the ring shape. The control device 30c projects the plural block groups connected in one axial direction onto one block group and selects the outgoing path and the returning path from the paths not connected to the failed nodes with respect to the block group where the plural blocks are projected. For this reason, the control device 30c can provide a network having the arbitrary size and directly connecting the computation nodes in the two-dimensional torus shape.

As a result, when the control device 30c divides the computation space in the two-dimensional torus shape, even though failed nodes exist, the control device 30c can map each area to the computation node having an appropriate position relation. It can be ensured that the nodes adjacent to each other in an arbitrary axial direction at the virtual node coordinates have direct paths.

[e] Fifth Embodiment

Figure 27:
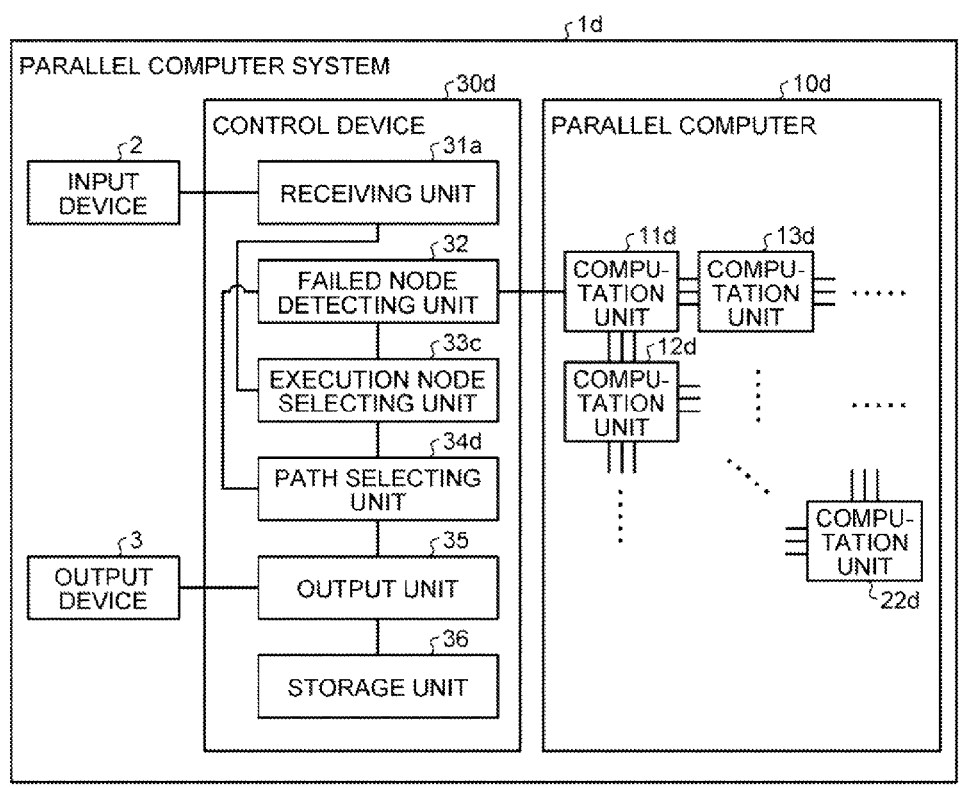
FIG. 27 is a diagram illustrating an example of a parallel computer system according to a fifth embodiment.

In the fifth embodiment, a parallel computer system 1d that selects the computation units in an appropriate range from the plural computation units of the parallel computer 10c according to the size of the network input by the user and assigns the virtual coordinates to the selected computation units will be described. FIG. 27 is a diagram illustrating an example of a parallel computer system according to the fifth embodiment. The components executing the same processes as the processes illustrated in the first to fourth embodiments among the components included in the parallel computer system 1d illustrated in FIG. 27 are denoted by the same reference numerals as those of the first to fourth embodiments and the description will not be repeated.

Figure 28:
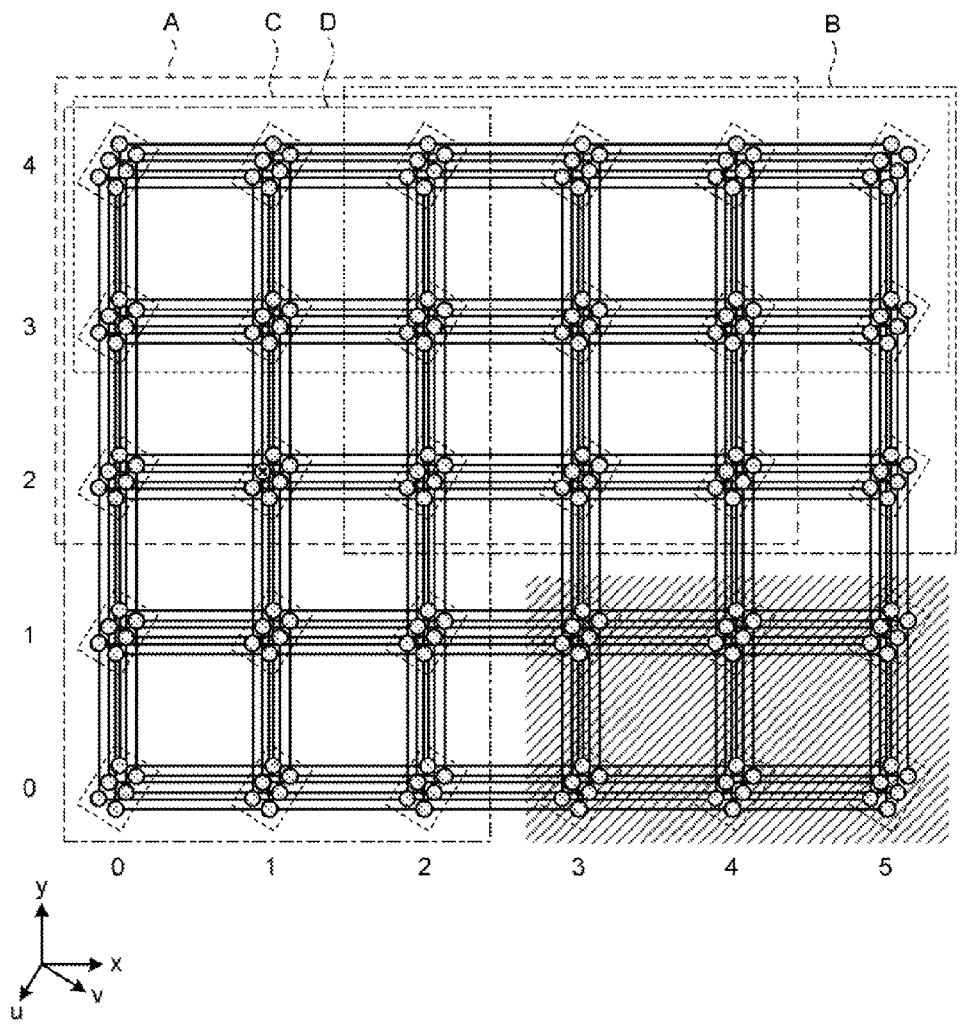
FIG. 28 is a diagram illustrating a parallel computer according to the fifth embodiment.

A parallel computer 10d has plural computation units 11d to 22d that are connected in the two-dimensional mesh shape. FIG. 28 is a diagram illustrating the parallel computer according to the fifth embodiment. In the description below, as illustrated in FIG. 28, the parallel computer 10c has 30 computation units that are connected in the two-dimensional mesh shape in which "6" computation units are provided in the x-axis direction and "5" computation units are provided in the y-axis direction.

Similar to the computation units 11a to 22a according to the fourth embodiment, each computation unit has 6 computation nodes that are connected in a torus shape. For this reason, the physical coordinates of "(0, 0, 0, 0)" to "(5, 4, 2, 3)" in the x-axis direction, the y-axis direction, the u-axis direction, and the v-axis direction are assigned to the computation nodes. The computation node that is positioned at the physical coordinates "(1, 2, 1, 0)" is the failed node. A range of the computation units covered by a slant line in FIG. 28 illustrates a range of the computation units already executing another program.

Returning to FIG. 27, a control device 30d has an execution node selecting unit 33c. The execution node selecting unit 33c selects the computation units that are included in the appropriate range and does not execute the program, from the plural computation units of the parallel computer 10d, according to the size of the network designated by the user.

Specifically, the execution node selecting unit 33c receives the notification of the size of the virtual coordinates to execute the program by the user, from the receiving unit 31a. The execution node selecting unit 33c receives the notification of the physical coordinates of the failed nodes from the failed node detecting unit 32. The execution node selecting unit 33c detects a range of the computation units other than the computation units executing the program, from the computation units of the parallel computer 10d.

The execution node selecting unit 33c selects the range of the computation units executing the program, on the basis of the notified sizes of the virtual network. Specifically, the execution node selecting unit 33c calculates all of the combinations of the failure avoidance axes and the size of the numbers assigned in the axial directions of the virtual coordinates. The execution node selecting unit 33c selects a range of the computation units to be provided with the virtual coordinates according to each calculated combination. The execution node selecting unit 33c determines whether the virtual coordinates of the notified sizes can be assigned to the computation units of the selected range, from the selected range of the computation units and the notified physical coordinates of the failed nodes.

Then, when it is determined that the virtual coordinates of the sizes notified to the computation units of the selected range can be assigned, the execution node selecting unit 33c notifies a path selecting unit 34d of the computation units in the selected range. When it is determined that the virtual coordinates of the sizes notified to the computation units of the selected range is not assigned, the execution node selecting unit 33c reselects a range of the computation units executing the program and redetermines whether the virtual coordinates can be assigned.

Next, a specific example of a process that is executed by the control device 30d will be described. FIG. 29 is a diagram illustrating an example of a program that is executed in the parallel computer by the user. The program that is illustrated in FIG. 29 uses an MPI library that describes communication between the computation nodes.

The MPI library reads a list of computation node names called a machine file at the time of starting execution of the program and specifies the association between numbers (rank numbers) of the computation nodes described in the program and the physical coordinates of the computation nodes. For example, in the machine file, names "nodexyuv" of the computation nodes that are positioned at the coordinates (x, y, u, v) are stored in one by one in row and the rank numbers that start from "0" are allocated in the storage order.

FIG. 30 is a diagram illustrating the plural nodes by which the user intends to execute the program. As illustrated in FIG. 30, the user intends to execute the program by the total "72" computation nodes of the computation nodes "0" to "11" in the ix-axis direction and the computation nodes "0" to "5" in the iy-axis direction and generates the program illustrated in FIG. 26. The user requests to allocate the program to the two-dimensional torus network where the sizes are "12×6" to efficiently perform communication between the computation nodes.

In this case, the control device 30d determines the torus network where the sizes of the virtual coordinates assigned to the computation nodes are "12×6". The control device 30d detects the physical coordinates "(1, 2, 1, 0)" of the failed nodes from the computation units of the parallel computer 10d.

The control device 30d selects a range of the computation units executing the program, on the basis of the determined sizes of the virtual coordinates. Specifically, the control device 30d calculates combinations of the failure avoidance axes and the sizes of the numbers assigned in the axial directions of the virtual coordinates. In this example, the control device 30d calculates combinations of "(xu, yv)=(12, 6)", "(xu, yv)=(6, 12)", "(yu, xv)=(12, 6)", and "(yu, xv)=(6, 12)".

In this case, the range that is illustrated by A of FIG. 28 is a range of the computation units to assign the virtual coordinates, when "(xu, yv)=(12, 6)" is selected. That is, when an original point of A of FIG. 28 is represented by "(x, y)=(0, 2)", the relative coordinates of the failed node viewed from the original point become "(1, 0, 1, 0)" and the failure avoidance unit becomes "(x, u)=(1, 1)". For this reason, the number "$n_1$" of computation units that are used in the x-axis direction becomes "$n_1$=5" by solving Equation 1 by "N=12", "m=3", and "k=1". In addition, the number "$n_2$" of computation units that are used in the y-axis direction becomes "$n_2$=3" by solving Equation 2 by "N=6" and "m=2".

The range that is illustrated by B of FIG. 28 is a range of the computation units to assign the virtual coordinates, when "(xu, yv)=(6, 12)" is selected. In the range illustrated by B of FIG. 28, since there is not a failed node, the number "$n_1$" of computation units becomes "$n_1$=4". The range that is illustrated in C of FIG. 28 is a range of the computation units to assign the virtual coordinates, when "(yu, xv)=(12, 6)" is selected. The range that is illustrated by D of FIG. 28 is a range of the computation units to assign the virtual coordinates, when "(yu, xv)=(6, 12)" is selected.

In the example illustrated in FIG. 28, the control device 30d can select a range of computation units that can assign the virtual coordinates, with respect to each calculated combination. For this reason, the control device 30d selects the range illustrated by A of FIG. 28, according to the predetermined job scheduling strategy. In this case, the arbitrary job scheduling strategy can be applied to the control device 30d.

Next, the control device 30d selects a path in the x-axis direction, with respect to the selected range, similar to the fourth embodiment. FIG. 31 is a diagram illustrating an example of a process of selecting the path in the x-axis direction by the control device according to the fifth embodiment. As illustrated in FIG. 31, the control device 30d selects the outgoing path and the returning path from the paths other than the paths connected to the failure avoidance units between the blocks of each block group multiplexed on the xu plane and selects a ring-shaped path to pass the multiplexed computation node only once. In the example illustrated in FIG. 31, the control device 30d selects the types "20", "20", "01", and "12" between the blocks and assigns the continues numbers "0" to "11" to the multiplexed computation node to follow the selected path.

FIG. 32 is a table illustrating the virtual coordinates of the ix-axis direction assigned to each computation node. In an example illustrated in FIG. 32, the control device 30d assigns the virtual coordinates "ix=0" to all of the computation nodes where the physical coordinates are "(x, u)=(0, 0)", among the computation nodes included in the range of the selected computation units. Likewise, the control device 30d assigns the virtual coordinates "ix=1" to all of the computation nodes where the physical coordinates are "(x, u)=(1, 0)", among the computation nodes included in the range of the selected computation units. Hereinafter, the control device 30d assigns the virtual coordinates "ix=2 to 11" to the computation nodes where the physical coordinates are "(x, u)=(2, 0), (3, 0), (3, 2), (4, 2), (4, 1), (3, 1), (2, 1), (2, 2), (1, 2), and (0, 2)".

Next, the control device 30d selects a path in the iy-axis direction, similar to the fourth embodiment. FIG. 33 is a diagram illustrating an example of a process of selecting a path in the y-axis direction by the control device according to the fifth embodiment. As illustrated in FIG. 33, the control device 30d selects the path having a ring shape that passes each computation node of each block group multiplexed on the yv plane only once and assigns the continues numbers "0" to "5" to each computation node to follow the selected path.

Figures 34, 35:
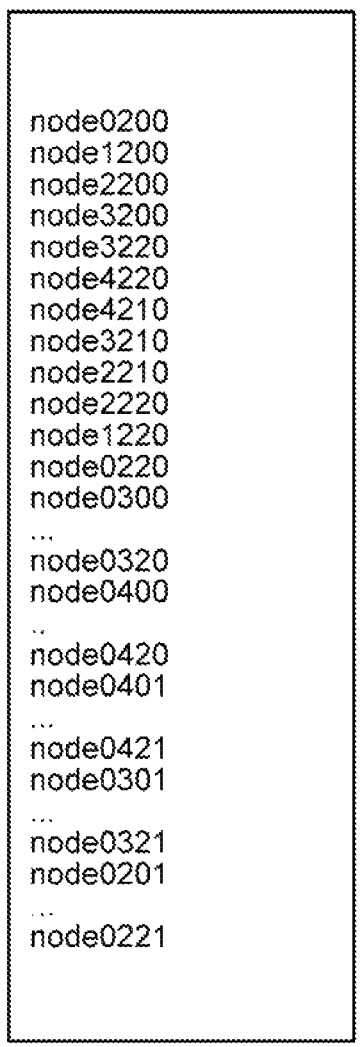
FIG. 34 is a table illustrating the virtual coordinates in an iy-axis direction assigned to each computation node.
FIG. 35 is a diagram illustrating an example of a machine file that is output by the control device according to the fifth embodiment.

FIG. 34 is a table illustrating the virtual coordinates in the iy-axis direction assigned to each computation node. In an example illustrated in FIG. 34, the control device 30d assigns the virtual coordinates "iy=0" to all of the computation nodes where the physical coordinates are "(y, v)=(2, 0)", among the computation nodes included in the range of the selected computation units. Likewise, the control device 30d assigns the virtual coordinates "iy=1 to 5" to the computation nodes where the physical coordinates are "(y, v)=(3, 0), (4, 0), (4, 1), (3, 1), and (2, 1)".

Then, the control device 30d outputs a machine file where the names of the individual computation nodes are arranged one-dimensionally, on the basis of the virtual coordinates assigned to the individual computation nodes. FIG. 35 is a diagram illustrating an example of the machine file that is output by the control device according to the fifth embodiment. As illustrated in FIG. 35, the control device 30d generates the machine file where the names of the computation nodes indicated by the virtual coordinates are stored, according to order of "0" to "71" illustrated in FIG. 30, when the virtual coordinates are assigned to the individual computation nodes. The control device 30d outputs the generated machine file and stores the machine file as the file used by the MPI library in the storage unit 36.

In the above-described example, there has been described about the example of the case where the virtual coordinates to directly connect the computation nodes in the two-dimensional torus shape are assigned to the computation nodes. However, the control device 30d executes the process of selecting the path described in the third embodiment and can assign the virtual coordinates to directly connect the computation nodes in the two-dimensional mesh shape to the computation nodes. The control device 30d executes the process illustrated in the first and second embodiments and can assign the virtual coordinates to directly connect the computation nodes in the one-dimensional mesh shape or the one-dimensional torus shape to the computation nodes.

Flow of Process of Control Device 30d

Figure 36:
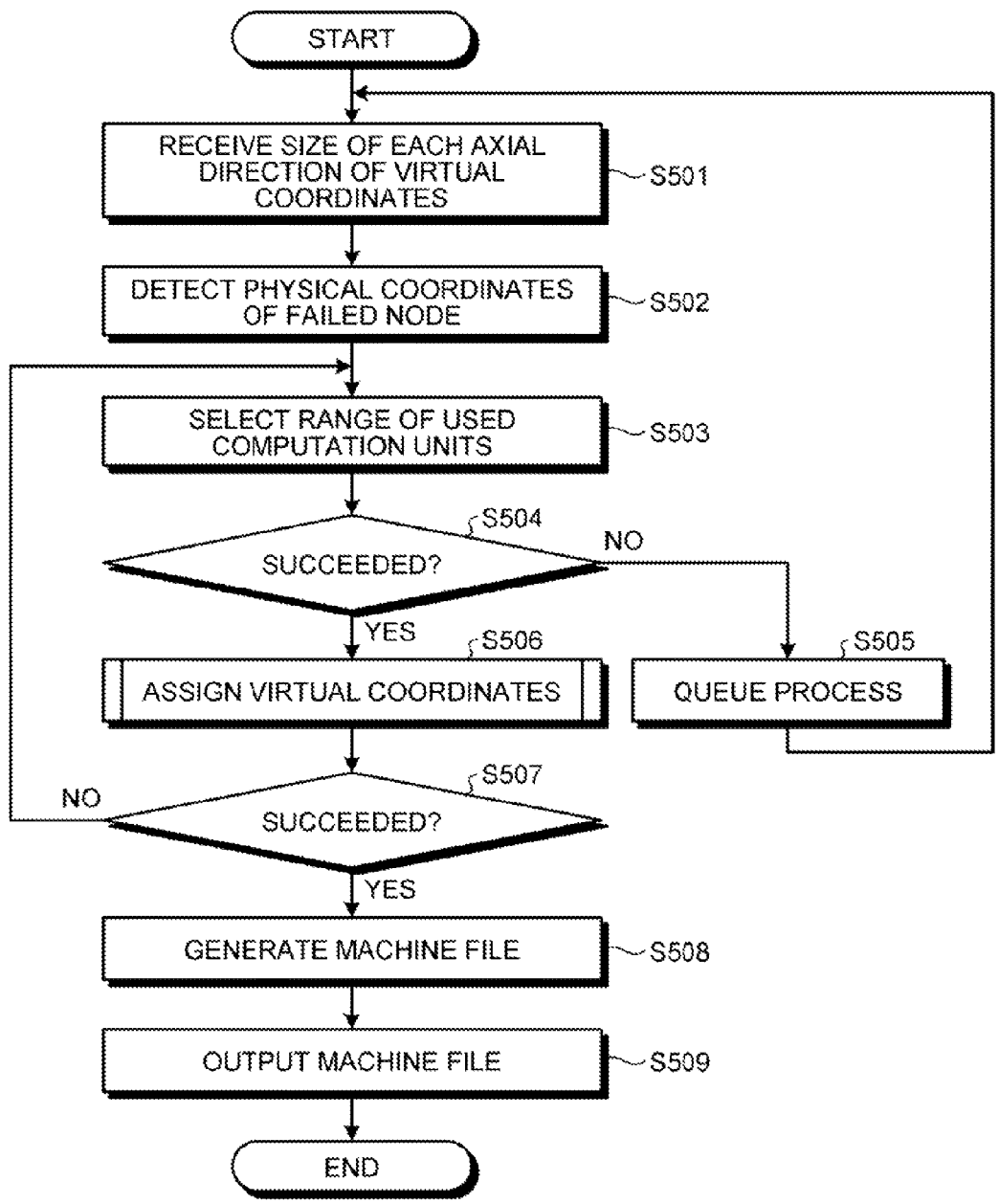
FIG. 36 is a flowchart illustrating an example of a flow of a process that is executed by the control device according to the fifth embodiment.

Next, an example of the flow of a process that is executed by the control device 30d will be described using FIG. 36. FIG. 36 is a flowchart illustrating an example of the flow of a process that is executed by the control device according to the fifth embodiment. The example illustrated in FIG. 36 is an example of a process that is generalized with respect to the process executed by the control device 30d. In the example illustrated in FIG. 36, the control device 30d starts the process when the sizes of the virtual coordinates are received from the user as a trigger.

First, the control device 30d receives the size in each axial direction of the virtual coordinates from the user (step S501). Next, the control device 30d detects the physical coordinates of the failed node (step S502). Next, the control device 30d selects a range of the computation units that do not execute another program (step S503). Next, the control device 30d determines whether a range of the computation units not executing another program can be selected (step S504). When the range is not selected (No in step S504), the control device 30d queues the process (step S505). Then, when the predetermined time passes or the executed program ends, the control device 30d starts the process from step S501 again.

When the range of the computation units not executing another program can be selected (Yes in step S504), the control device 30d assigns the virtual coordinates (step S506). The process of step S506 is the same process as the process illustrated in the fourth embodiment. Next, the control device 30d determines whether the assignment of the continuous virtual coordinates to the adjacent computation nodes is succeeded (step S507). When the continuous virtual coordinates is not assigned (No in step S507), the control device 30d executes the process of step S503 again.

When the assignment of the continuous virtual coordinates to the adjacent computation nodes is succeeded (Yes in step S507), the control device 30d generates a machine file where the name of each computation node is stored in order based on the virtual coordinates (step S508). Then, the control device 30d outputs the generated machine file (step S509) and ends the process.

Effects of Fifth Embodiment

As described above, the control device 30d selects a range of the computation units not executing another program, on the basis of the sizes of the virtual coordinates received from the user. The control device 30d selects the outgoing path and the returning path from the paths not connected to the failed nodes between the selected computation units and assigns the virtual coordinates to follow the selected paths.

For this reason, even when a multi-job where the parallel computer executes the plural programs is applied, the control device 30d can provide the computation nodes to be directly connected in the torus shape to the user. That is, the parallel computer 10d can simultaneously execute the plural programs that are executed using the computation nodes directly connected in the torus shape.

The control device 30d selects the range of the computation units on the basis of the sizes of the virtual coordinates received from the user. Therefore, the control device 30d can provide the minimum hardware resources to the user. Even when the failed nodes are included in the range of the selected computation units, the control device 30*d* can assign the continuous virtual coordinates to the adjacent computation nodes. As a result, it can be ensured that the nodes adjacent to each other with the virtual node numbers have the direct paths. For this reason, the control device 30*d* can efficiently execute the program, without deteriorating the communication efficiency between the computation nodes. The control device 30*d* can provide a service of the same quality to the user, without considering the failed nodes.

[f] Sixth Embodiment

The embodiments of the invention are described above. However, the invention can be embodied in various different forms, in addition to the embodiments described above. Therefore, another embodiment of the invention will be described below as a sixth embodiment.

(1) Control Device

The control device 30*b* according to the third embodiment assigns the virtual coordinates to each computation node, even when the parallel computer 10*a* having the plural computation units 11*a* to 22*a* directly connected in the two-dimensional mesh shape has the failed nodes. However, the embodiment is not limited thereto and the control device 30*b* may assign the virtual coordinates to each computation node, even when the parallel computer 10*a* has the plural computation units 11*a* to 22*a* directly connected in a mesh shape of arbitrary dimension.

Figure 37:
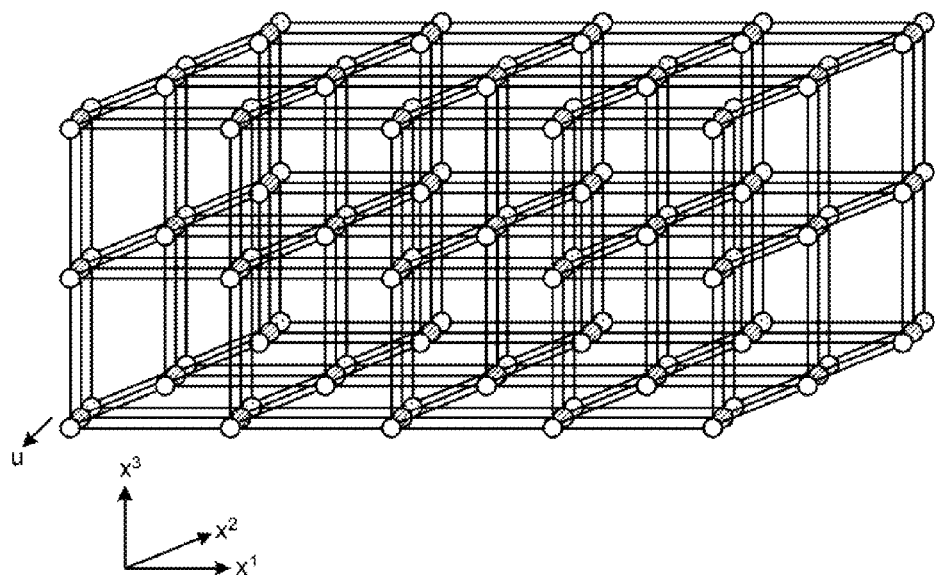
FIG. 37 is a diagram illustrating computation units that are connected in a three-dimensional mesh shape.

FIG. 37 is a diagram illustrating the computation units that are connected in a three-dimensional mesh shape. In an example illustrated in FIG. 37, the plural computation units that have the three computation nodes are directly connected in a three-dimensional mesh shape in an $x^1$-axis direction, an $x^2$-axis direction, and an $x^3$-axis direction. To the 3 computation nodes of each computation unit, numbers are assigned as a u-axis direction.

Even in this case, the control device 30*b* selects any axis of the $x^1$-axis direction, the $x^2$-axis direction, and the $x^3$-axis direction as the failure avoidance axis and sets the plural computation units connected in series in a direction of the selected failure avoidance axis as a computation unit group. The control device 30*b* multiplexes the computation unit groups on a plane including the selected failure avoidance axis (for example, the $x^2$ axis) and the u axis and multiplexes the detected failed node on the plane including the failure avoidance axis and the u axis.

Similar to the third embodiment, the control device 30*b* selects the path not connected to the multiplexed failed node to perform one-stroke drawing, with respect to the multiplexed computation unit group. Then, the control device 30*b* assigns the continuous number as the virtual coordinates in one axial direction (for example, the "$ix^2$"-axis direction) to each computation unit group to follow the selected path. The control device 30*b* assigns the virtual coordinates in the other axial directions (for example, the $ix^1$-axis direction and the $ix^3$-axis direction) to each computation node, on the basis of the physical coordinates (for example, the $x^1$ axis and the $x^3$ axis) other than the fail avoidance axis.

Even when the computation units are directly connected in a mesh shape of the four dimensions or more, the control device 30*b* can appropriately assign the virtual coordinates by the following process. That is, the control device 30*b* sets any axis as the failure avoidance axis, selects the computation unit groups, multiplexes the selected computation unit groups, and selects a path with respect to the multiplexed computation unit group. The control device 30*b* assigns the virtual coordinates in the one axial direction to the selected computation unit group to follow the selected path and assigns the virtual coordinates in the other axial directions, on the basis of the components other than the direction of the failure avoidance axis, among the physical coordinates of the computation nodes.

That is, when the computation units are directly connected in a multi-dimensional mesh shape, the control device 30*b* multiplexes the computation unit groups on an arbitrary plane and assigns the continuous virtual coordinates to the multiplexed computation unit group to avoid the multiplexed failed node. The control device 30*b* applies the assigned virtual coordinates to all of the computation unit groups and assigns the virtual coordinates to the computation nodes by repeating the same process with respect to the other dimensions. As a result, even when the computation units are directly connected in a mesh shape of four dimensions or more and the failed nodes are included, the control device 30*b* can assign the virtual coordinates to directly connect the computation units in a multi-dimensional mesh shape to the computation nodes.

As such, the control device 30*b* multiplexes the computation units on the plane based on the direction of the selected failure avoidance axis and selects the path not connected to the multiplexed failed node to perform one-stroke drawing, with respect to the multiplexed computation unit group. The control device 30*b* applies the path selected in the multiplexed computation unit group to each computation unit group and assigns the virtual coordinates to the computation nodes of each computation unit group to follow the applied path. For this reason, even when the computation units are directly connected by the meshed topology of the two dimensions or more, the control device 30*b* can assign the appropriate virtual coordinates to the computation nodes other than the failed nodes.

Figure 38:
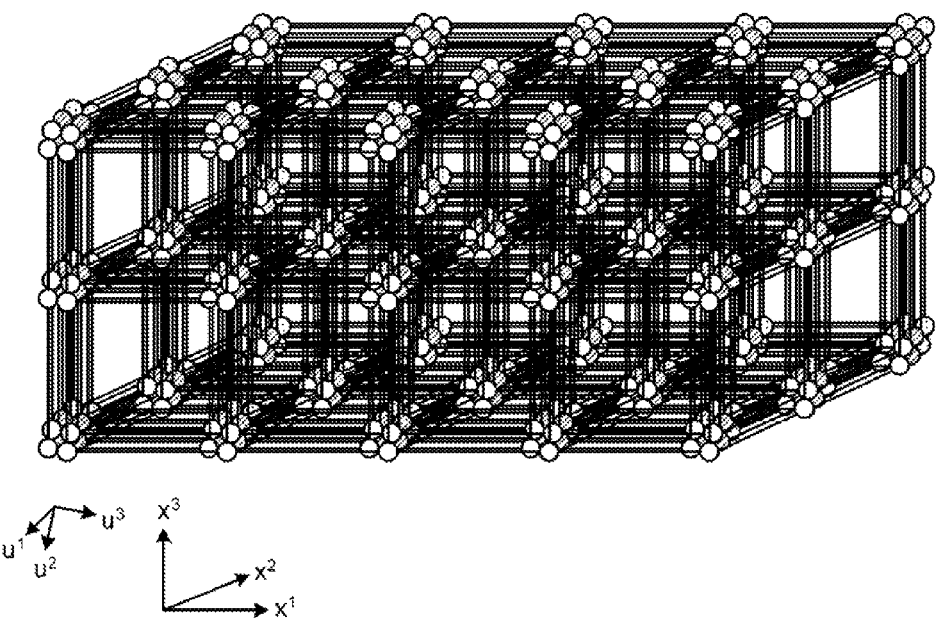
FIG. 38 is a diagram (1) illustrating an example of a case where computation units having computation nodes connected in a three-dimensional torus shape are connected in a three-dimensional mesh shape.

Similar to the control device 30*c* according to the fourth embodiment, even when the parallel computer has the plural computation units to be directly connected in the mesh shape of the arbitrary dimensions, the control device 30*b* can assign the virtual coordinates to each computation node. FIG. 38 is a diagram (1) illustrating an example of the case where the computation units having the computation nodes connected in the three-dimensional torus shape are connected in a three-dimensional mesh shape. In the example illustrated in FIG. 38, the computation units are directly connected in a three-dimensional mesh shape of the $x^1$ axis, the $x^2$ axis, and the $x^3$ axis. In the example illustrated in FIG. 38, the computation units are directly connected in a three-dimensional torus shape of the $u^1$ axis, the $u^2$ axis, and the $u^3$ axis.

In this case, the control device 30*c* selects any one axis of the $x^1$ to $x^3$ axes and any one axis of the $u^1$ to $u^3$ axes as the failure avoidance axes. The control device 30*c* sets the plural blocks that have the same values in the $u^1$ to $u^3$ axes and are directly connected in the direction of the failure avoidance axis selected from the $x^1$ to $x^3$ axes, as the block group.

The control device 30*c* multiplexes the block groups on the plane including the selected failure avoidance axes. The control device 30*c* multiplexes the failed nodes on the plane including the failure avoidance axes and sets the position of the multiplexed failed node as the failure avoidance unit. The control device 30*c* selects the outgoing path and the returning path from the paths not connected to the failure avoidance unit, such that the paths are repeated from the block of one end to the block of the other end, with respect to the multiplexed block group. Then, the control device 30*c* applies the selected path to all of the block groups and assigns the continuous number as the first dimension of the virtual coordinates to each computation node to follow the path applied to all of the block groups.

The control device 30c multiplexes the block groups on the plane including the axis not selected as the failure avoidance axis from the $x^1$ to $x^3$ axes and the axis not selected as the failure avoidance axis from the $u^1$ to $u^3$ axes. The control device 30c selects the path to connect the multiplexed block group in a ring shape and assigns the continuous numbers as the second dimension of the virtual coordinates and the third dimension of the virtual coordinates to each computation node to follow the selected path.

Figure 39:
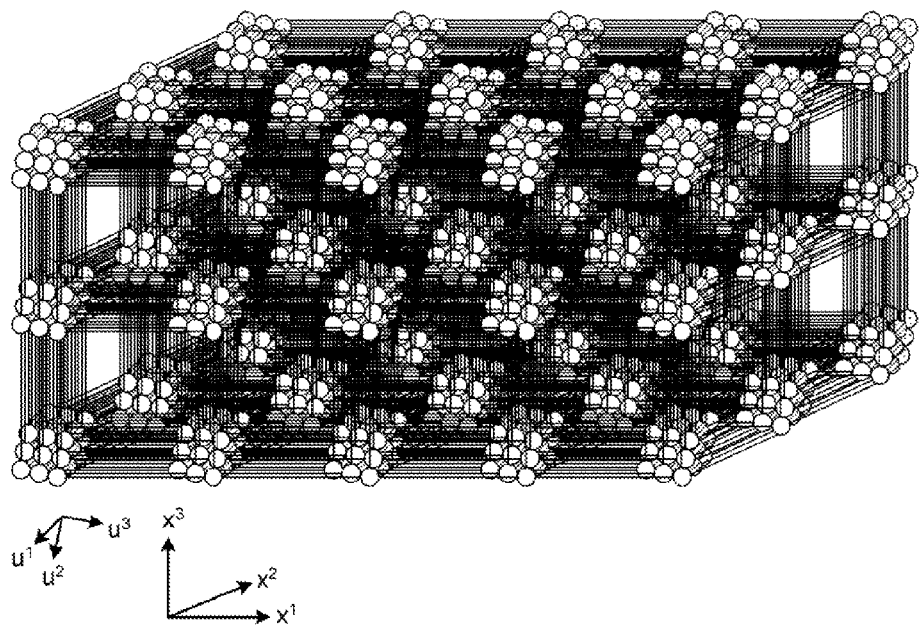
FIG. 39 is a diagram (2) illustrating an example of the case where computation units having computation nodes connected in a three-dimensional torus shape are connected in a three-dimensional mesh shape.

FIG. 39 is a diagram illustrating an example of the case where the computation units having the computation nodes connected in a three-dimensional torus shape are connected in a three-dimensional mesh shape. As illustrated in FIG. 39, even when the computation nodes are extended in the $u^3$-axis direction, the control device 30c executes the above process and can assign the virtual coordinates to provide the computation nodes directly connected in the torus shape to the computation nodes, while avoiding the failed nodes.

Even when the computation units are directly connected in a mesh shape of four dimensions or more, the control device 30c can appropriately assign the virtual coordinates by the following process. That is, the control device 30c selects, as the failure avoidance axes, two axes: any one axis of the axial directions indicating the physical coordinates of the computation units; and any one axis of the axial directions indicating the computation nodes of the computation units. Similar to the above process, the control device 30c multiplexes the block groups on the plane including the two axes selected as the failure avoidance axes, selects a ring-shaped path with respect to the multiplexed block group, and assigns the first dimension of the virtual coordinates to each computation unit along the selected path.

The control device 30c selects one of the axes not selected as the failure avoidance axes from the axial directions indicating the physical coordinates of the computation units and the axial directions indicating the computation nodes of the computation units and multiplexes the computation unit groups on the plane including the selected two axes. The control device 30c selects the path to connect the multiplexed computation unit groups in the ring shape and assigns the other dimensions of the virtual coordinates to the computation nodes along the selected path.

That is, the control device 30c selects the path to connect the normal computation nodes included in the multiplexed computation unit group in the ring shape and applies the selected path to all of the computation unit groups. The control device 30c repeats a process of selecting a path to connect the multiplexed computation unit with respect to the other dimensions. As a result, even when the failed nodes are included in the computation units connected in the mesh shape having the arbitrary dimension number, the control device 30c can assign the virtual coordinates to provide the computation nodes directly connected in the multi-dimensional torus shape, to the computation nodes.

(2) Control Device According to Each Embodiment

In the first to fourth embodiments described above, the control devices 30 to 30d that assign the virtual coordinates to the plural computation nodes directly connected by the different topologies are described. However, the embodiments are not limited thereto. For example, the control device may have all of the functions of the control devices 30 to 30d and select a process of assigning the virtual coordinates from the processes executed by the control devices 30 to 30d, on the basis of the sizes of the virtual coordinates input by the user.

For example, when the sizes of the virtual coordinates input by the user are one dimension, a control device 30e according to the sixth embodiment selects the plural computation units connected in the two-dimensional mesh shape from the parallel computer. The control device 30e executes the same process as that of the control device 30 or the control device 30a with respect to the selected plural computation units.

For example, when the sizes of the virtual coordinates input by the user are two dimensions, the control device 30e according to the sixth embodiment selects the plural computation units connected in a mesh shape of arbitrary dimensions from the parallel computer. The control device 30e may execute the same process as that of the control device 30c.

The control device 30e assigns the virtual coordinates to directly connect the computation units in a two-dimensional torus shape to the computation units of the partial range among the plural computation units of one parallel computer. Then, the control device 30e may assign the virtual coordinates to directly connect the computation units in a two-dimensional mesh shape or the virtual coordinates to directly connect the computation nodes in a one-dimensional ring shape or mesh shape to the computation units of the other range.

(3) Execution of Program

The control devices 30 to 30e assign the virtual coordinates to each computation node, on the basis of the sizes of the virtual coordinates input by the user. However, the embodiments are not limited thereto. For example, when the executed program is acquired, the control devices 30 to 30e analyze the acquired program and determine the topology and the sizes of the network where the program is executed. The control devices 30 to 30e select a range of the computation units used from the parallel computer according to the determined topology and sizes and assign the virtual coordinates to the range of the selected computation units. Then, the control devices 30 to 30c may allocate the job executed by the program to each computation node, on the basis of the virtual coordinates assigned to each computation node, and execute the program.

In the embodiments described above, the example of the case where the result of the assignment of the virtual coordinates by the control devices 30 to 30e is output as the machine file used by the library at the time of executing the MPI is described. However, the embodiments are not limited thereto and the result may be output as data of an arbitrary format.

(4) Configuration of Computation Node

In the examples described above, each of the computation nodes 40 to 48 has the CPU 50, the memory 51, and the network interface 52. However, the embodiments are not limited thereto and the arbitrary configuration may be applied in the case of the computation nodes that can execute the job and can be directly connected to the other computation nodes.

(5) Program

Figure 40:
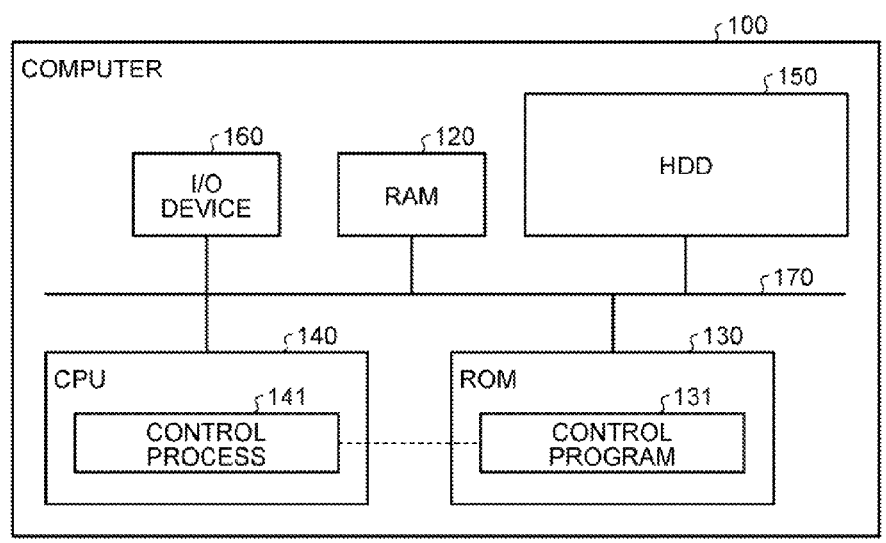
FIG. 40 is a diagram illustrating an example of a computer that executes a control program.
Figure 41:
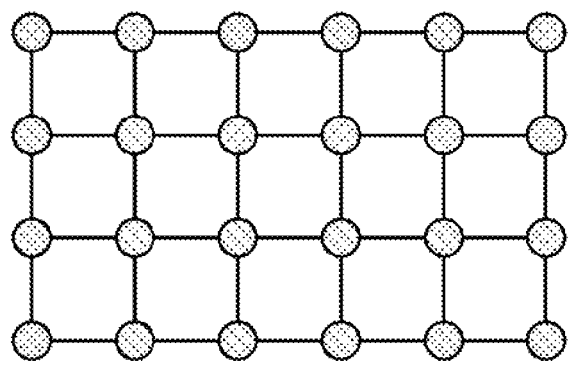
FIG. 41 is a diagram illustrating a network of computation nodes that are connected by a direct interconnection network based on meshed topology.
Figure 42:
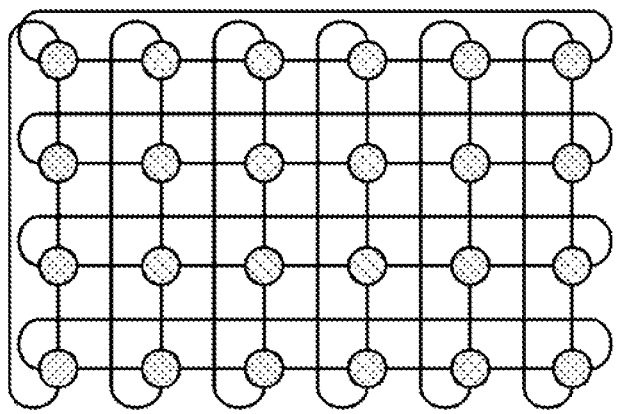
FIG. 42 is a diagram illustrating a network of computation nodes that are connected by a direct interconnection network based on torus topology.

The case where the control devices 30 to 30e according to the first to fifth embodiments execute the various processes using the hardware is described above. However, the embodiments are not limited thereto and the various processes may be realized by executing a prepared program by a computer controlling the parallel computer. Hereinafter, an example of a computer executing a program having the same functions as those of the control device 30 according to the first embodiment will be described using FIG. 40. FIG. 40 is a diagram illustrating an example of a computer that executes a control program.

In a computer 100 that is illustrated in FIG. 40, a RAM 120, a ROM 130, and an HDD 150 are connected via a bus 170. In the computer 100 illustrated in FIG. 40, a CPU 140 is connected via the bus 170. An input/output (I/O) device 160 that receives the sizes of the virtual coordinates from the user and performs detection of the failed node of the parallel computer or allocation of the job with respect to each computation node is connected to the bus 170.

In the ROM 130, a control program 131 is previously stored. The CPU 140 reads the control program 131 from the ROM 130 and executes the control program. As a result, the control program 131 functions as a control process 141, in an example illustrated in FIG. 40. The control process 141 illustrates the same functions as those of the control device 30 illustrated in FIG. 1. The control process 141 has the same function as that of each unit according to the second to sixth embodiments.

The control program described in this embodiment can be realized by executing a prepared program by a computer such as a personal computer or a workstation. This program can be distributed through the network such as the Internet. The program is recorded in a computer readable recording medium such as a hard disk, a flexible disk (FD), a compact disk read only memory (CD-ROM), a magneto optical disc (MO), and a digital versatile disc (DVD). The program can be executed by reading the program from the recording medium by the computer.

In the technology that is discussed in the embodiments, according to one aspect, even when the failed node where a failure has occurred is detected from the plural computation nodes included in the parallel computer, each area can be mapped to the appropriate computation node.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it may be understood that the various changes, substitutions, and alterations could be made hereto without departing from the spirit and scope of the invention.

What is claimed is:

1. A parallel computer system comprising:
   a parallel computer that executes a program; and
   a control device that controls the parallel computer,
   wherein the parallel computer includes
   a plurality of computation units each having a plurality of computation nodes connected to one another, and
   a plurality of links each connecting two computation units adjacent to each other through a plurality of paths configured to connect computation nodes included in two computation units adjacent to each other in a one-to-one manner, and
   the control device comprising:
   a failed node detecting unit that detects a failed node in which a failure has occurred from the computation nodes,
   an execution node selecting unit that selects execution nodes for executing the program from the computation nodes of the parallel computer except the detected failed nodes based on the number of computation nodes needed to execute the program; and
   a path selecting unit that selects a path to connect the computation nodes from the paths included in the links which connect two computation units adjacent to each other in the plurality of computation units including the selected execution nodes except the path connected to the detected failed node, multiplexes all of the computation unit groups notified from the execution node selecting unit in a planar direction including a failure avoidance axis, selects a path to avoid the computation node at the position of the multiplexed failed node to perform one-stroke drawing, with respect to the computation unit group obtained by multiplexing the computation unit groups, and applies the selected path to all of the computation unit groups.

2. The parallel computer system according to claim 1, wherein the plurality of computation units are connected linearly through the plurality of links,
the plurality of computation nodes included in each computation unit are connected in a torus shape, and
the path selecting unit selects a path from any one of the computation nodes included in the computation unit disposed on one end to any one of the computation nodes included in the computation unit disposed on the other end, from the computation units including the selected execution nodes except the path connected to the detected failed node, by performing a one-stroke drawing with respect to the paths.

3. The parallel computer system according to claim 1, wherein the plurality of computation units are connected linearly through the plurality of links,
the plurality of computation nodes included in each computation unit are connected in a torus shape, and
the path selecting unit selects a path of an outgoing path and a returning path connecting from the computation nodes included in the computation unit disposed on one end to any one of the computation nodes included in the computation unit disposed on the other end, from the computation units including the selected execution nodes except the path connected to the detected failed node, such that the paths are repeated from the computation unit disposed on the other end.

4. The parallel computer system according to claim 1, wherein the plurality of computation units are connected in a two-dimensional mesh shape in an X-axis direction and a Y-axis direction through the plurality of links,
the plurality of computation nodes included in each computation unit are connected in a torus shape, and
the path selecting unit selects a path from any one of the computation nodes included in the computation unit disposed on one end to any one of the computation nodes included in the computation unit disposed on the other end, from the computation units including the selected execution nodes except the path connected to the detected failed node, by performing a one-stroke drawing, with respect to each of a plurality of computation unit groups connected in the X-axis direction.

5. The parallel computer system according to claim 1, wherein the plurality of computation units are connected in a two-dimensional mesh shape in an X-axis direction and a Y-axis direction through the plurality of links,
the plurality of computation nodes included in each computation unit are connected in a torus shape, and
the path selecting unit selects a path of an outgoing path and a returning path connecting from the computation nodes included in the computation unit disposed on one end to any one of the computation nodes included in the computation unit disposed on the other end, from the computation units including the selected execution nodes except the path connected to the detected failed node, such that the paths are repeated from the computation unit disposed on the other end, with respect to each of the computation units connected in the X-axis direction.

6. The parallel computer system according to claim 1, wherein the plurality of computation units are connected in a mesh shape having an arbitrary dimension number through the plurality of links,
the plurality of computation nodes included in each computation unit are connected in a torus shape, the path selecting unit divides each of the computation units into a plurality of blocks having an equal number of the computation nodes, selects a path from any one of the computation nodes included in the block disposed on one end to the computation nodes included in the block disposed on the other end, from the computation units including the selected execution nodes except the path connected to the detected failed node, by performing a one-stroke drawing with respect to any one of the block groups including the blocks connected by the link which connects the plurality of computation units in an arbitrary axial direction among the links, and applies the selected paths to all of the block groups.

7. The parallel computer system according to claim 1, wherein the plurality of computation units are connected in a mesh shape having an arbitrary dimension number through the plurality of links,
the plurality of computation nodes included in the plurality of computation units are connected in a torus shape, and
the path selecting unit divides each of the computation units into a plurality of blocks having an equal number of the computation nodes, selects a path of an outgoing path and a returning path from the block disposed on one end to the block disposed on the other end, from some blocks out of the plurality of blocks including the selected execution nodes except the path connected to the detected failed node, such that the path are repeated from the block disposed on the other end, with respect to any one of the block groups including the blocks connected by the link which connects the plurality of computation units in an arbitrary axial direction among the links, and applies the selected paths to all of the block groups.

8. A control device that controls a parallel computer including a plurality of computation units having a plurality of computation nodes and a plurality of links each connecting two computation units adjacent to each other through a plurality of paths configured to connect computation nodes included in two computation units adjacent to each other in a one-to-one manner, wherein the control device comprising:
a failed node detecting unit that detects a failed node in which a failure has occurred from the computation nodes,
an execution node selecting unit that selects execution nodes for executing the program from the computation nodes of the parallel computer except the detected failed nodes based on the number of computation nodes needed to execute the program; and
a path selecting unit that selects a paths to connect the computation nodes from the paths included in the links which connect two computation units adjacent to each other in the plurality of computation units including the selected execution nodes except the path connected to the detected failed node, multiplexes all of the computation unit groups notified from the execution node selecting unit in a planar direction including a failure avoidance axis, selects a path to avoid the computation node at the position of the multiplexed failed node to perform one-stroke drawing, with respect to the computation unit group obtained by multiplexing the computation unit groups, and applies the selected path to all of the computation unit groups.

9. The control device according to claim 8, wherein the plurality of computation units are connected linearly through the plurality of links,
the plurality of computation nodes included in each computation unit are connected in a torus shape, and
the path selecting unit selects a path from any one of the computation nodes included in the computation unit disposed on one end to any one of the computation nodes included in the computation unit disposed on the other end, from the computation units including the selected execution nodes except the path connected to the detected failed node, by performing a one-stroke drawing with respect to the paths.

10. The control device according to claim 8, wherein the plurality of computation units are connected linearly through the plurality of links,
the plurality of computation nodes included in each computation unit are connected in a torus shape, and
the path selecting unit selects a path of an outgoing path and a returning path connecting from the computation nodes included in the computation unit disposed on one end to any one of the computation nodes included in the computation unit disposed on the other end, from the computation units including the selected execution nodes except the path connected to the detected failed node, such that the paths are repeated from the computation unit disposed on the other end.

11. The control device according to claim 8, wherein the plurality of computation units are connected in a two-dimensional mesh shape in an X-axis direction and a Y-axis direction through the plurality of links,
the plurality of computation nodes included in each computation unit are connected in a torus shape, and
the path selecting unit selects a path from any one of the computation nodes included in the computation unit disposed on one end to any one of the computation nodes included in the computation unit disposed on the other end, from the computation units including the selected execution nodes except the path connected to the detected failed node, by performing a one-stroke drawing, with respect to each of a plurality of computation unit groups connected in the X-axis direction.

12. The control device according to claim 8, wherein the plurality of computation units are connected in a two-dimensional mesh shape in an X-axis direction and a Y-axis direction through the plurality of links,
the plurality of computation nodes included in each computation unit are connected in a torus shape, and
the path selecting unit selects a path of an outgoing path and a returning path connecting from the computation nodes included in the computation unit disposed on one end to any one of the computation nodes included in the computation unit disposed on the other end, from the computation units including the selected execution nodes except the path connected to the detected failed node, such that the paths are repeated from the computation unit disposed on the other end, with respect to each of the computation units connected in the X-axis direction.

13. The control device according to claim 8, wherein the plurality of computation units are connected in a mesh shape having an arbitrary dimension number through the plurality of links, the plurality of computation nodes included in each computation unit are connected in a torus shape, the path selecting unit divides each of the computation units into a plurality of blocks having an equal number of the computation nodes, selects a path from any one of the computation nodes included in the block disposed on one end to the computation nodes included in the block disposed on the other end, from the computation units including the selected execution nodes except the path connected to the detected failed node, by performing a one-stroke drawing with respect to any one of the block groups including the blocks connected by the link which connects the plurality of computation units in an arbitrary axial direction among the links, and applies the selected paths to all of the block groups.

14. The control device according to claim 8,
wherein the plurality of computation units are connected in a mesh shape having an arbitrary dimension number through the plurality of links,
the plurality of computation nodes included in the plurality of computation units are connected in a torus shape, and
the path selecting unit divides each of the computation units into a plurality of blocks having an equal number of the computation nodes, selects a path of an outgoing path and a returning path from the block disposed on one end to the block disposed on the other end, from some blocks out of the plurality of blocks including the selected execution nodes except the path connected to the detected failed node, such that the path are repeated from the block disposed on the other end, with respect to any one of the block groups including the blocks connected by the link which connects the plurality of computation units in an arbitrary axial direction among the links, and applies the selected paths to all of the block groups.

15. A controlling method for parallel computer system that includes a parallel computer and a control device controlling the parallel computer, the controlling method comprising:
detecting a failed node in which a failure has occurred from a plurality of computation nodes included in a plurality of computation units included in the parallel computer,
choosing execution nodes for executing the program from the computation nodes of the parallel computer except the detected failed nodes based on the number of computation nodes needed to execute the program;
first selecting a paths to connect the computation nodes from a plurality of links each connecting two computation units adjacent to each other through a plurality of paths configured to connect computation nodes included in two computation units adjacent to each other in a one-to-one manner included in the links connecting two computation units adjacent to each other in the plurality of computation units including the chosen execution nodes except the path connected to the detected failed node;
multiplexing all of the computation unit groups notified at the choosing in a planar direction including a failure avoidance axis;
second selecting a path to avoid the computation node at the position of the multiplexed failed node to perform one-stroke drawing, with respect to the computation unit group obtained by multiplexing the computation unit groups; and
applying the selected path to all of the computation unit groups.

16. The method of controlling a parallel computer system according to claim 15,
wherein the plurality of computation units are connected linearly through the plurality of links and the plurality of computation nodes included in each computation unit are connected in a torus shape, and
the first selecting includes selecting a path from any one of the computation nodes included in the computation unit disposed on one end to any one of the computation nodes included in the computation unit disposed on the other end, from the computation units including the choosed execution nodes except the path connected to the detected failed node, by performing a one-stroke drawing with respect to the paths.

17. The method of controlling a parallel computer system according to claim 15,
wherein the plurality of computation units are connected linearly through the plurality of links and the plurality of computation nodes included in each computation unit are connected in a torus shape, and
the first selecting includes selecting a path of an outgoing path and a returning path connecting from the computation nodes included in the computation unit disposed on one end to any one of the computation nodes included in the computation unit disposed on the other end, from the computation units including the choosed execution nodes except the path connected to the detected failed node, such that the paths are repeated from the computation unit disposed on the other end.

18. The method of controlling a parallel computer system according to claim 15,
wherein the plurality of computation units are connected in a two-dimensional mesh shape in an X-axis direction and a Y-axis direction through the plurality of links and the plurality of computation nodes included in the plurality of computation units are connected in a torus shape, and
the first selecting includes selecting a path from any one of the computation nodes included in the computation unit disposed on one end to any one of the computation nodes included in the computation unit disposed on the other end, from the computation units including the choosed execution nodes except the path connected to the detected failed node, by performing a one-stroke drawing, with respect to each of a plurality of computation unit groups connected in the X-axis direction.

19. The method of controlling a parallel computer system according to claim 15,
wherein the plurality of computation units are connected in a two-dimensional mesh shape in an X-axis direction and a Y-axis direction through the plurality of links and the plurality of computation nodes included in the plurality of computation unit are connected in a torus shape, and
the first selecting includes selecting a path of an outgoing path and a returning path connecting from the computation nodes included in the computation unit disposed on one end to any one of the computation nodes included in the computation unit disposed on the other end, from the computation units including the choosed execution nodes except the path connected to the detected failed node, such that the paths are repeated from the computation unit disposed on the other end, with respect to each of the computation units connected in the X-axis direction.

* * * * *